(12) United States Patent
Factor

(10) Patent No.: US 8,371,518 B2
(45) Date of Patent: Feb. 12, 2013

(54) PIPE DISPENSER

(76) Inventor: Charles Factor, West Warwick, RI (US)

(*) Notice: Subject to any disclaimer, the term of this patent is extended or adjusted under 35 U.S.C. 154(b) by 320 days.

(21) Appl. No.: 12/754,105

(22) Filed: Apr. 5, 2010

(65) Prior Publication Data

US 2011/0108658 A1     May 12, 2011

Related U.S. Application Data

(60) Provisional application No. 61/260,446, filed on Nov. 12, 2009.

(51) Int. Cl.
*B65H 49/00* (2006.01)

(52) U.S. Cl. ..... 242/557; 242/571; 242/588; 242/595.1; 242/597.1; 242/597.5; 242/597.8

(58) Field of Classification Search ............ 242/557, 242/588, 129, 597, 597.1, 597.4, 597.5, 597.8, 242/398, 401, 402, 403, 403.1, 571, 595–595.1
See application file for complete search history.

(56) References Cited

U.S. PATENT DOCUMENTS

| | | | |
|---|---|---|---|
| 2,220,230 A | 11/1940 | Gilbert | |
| 3,072,357 A | 1/1963 | Sprague et al. | |
| 4,422,596 A | 12/1983 | Cleavenger | |
| 4,949,909 A | 8/1990 | Hatfield | |
| 6,419,424 B1 | 7/2002 | Null et al. | |
| 6,523,777 B2 | 2/2003 | Gaudio | |
| 6,655,627 B2 | 12/2003 | Patton | |
| 7,080,802 B2 | 7/2006 | Bayer et al. | |
| 7,243,876 B2 | 7/2007 | Robison | |
| 2003/0108391 A1 | 6/2003 | Essay | |
| 2008/0029639 A1 | 2/2008 | Dethier | |

FOREIGN PATENT DOCUMENTS

JP     05058557 A  *  3/1993

OTHER PUBLICATIONS http://www.utimachines.com/reelking_files/reelking.htm, Underground Technologies Inc., The wUNDERreel.

* cited by examiner

*Primary Examiner* — William E Dondero
(74) *Attorney, Agent, or Firm* — Salter & Michaelson

(57) ABSTRACT

An apparatus for supporting and dispensing a pipe roll. The apparatus includes a frame that has opposite one and other frame ends; a first pair of rollers that are spacedly disposed and mounted at the one end of the frame; and a second pair of rollers that are spacedly disposed and mounted at the other end of the frame. The second pair of rollers are disposed in spaced relationship to the first pair of rollers. The first and second pairs of rollers all extend substantially in parallel to each other and define a circular locus with corresponding support points for the pipe roll. A free standing spool support structure is also disclosed.

40 Claims, 35 Drawing Sheets

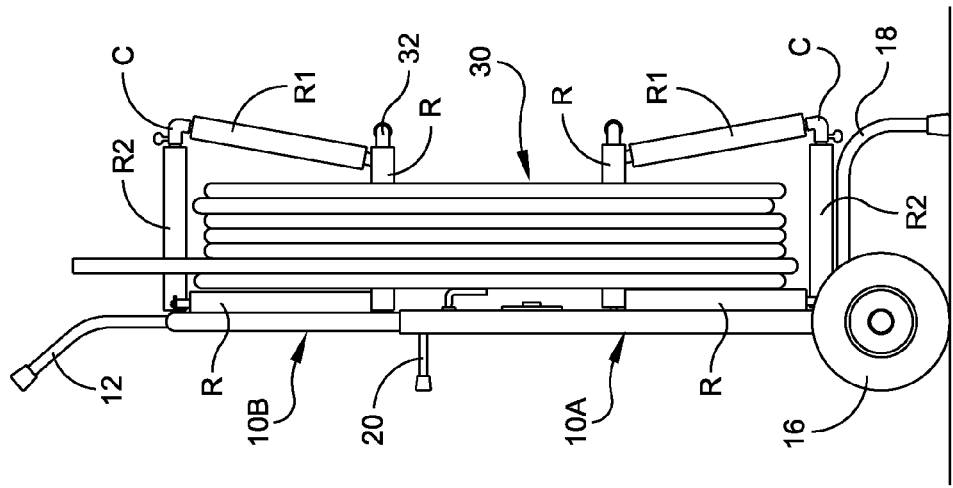
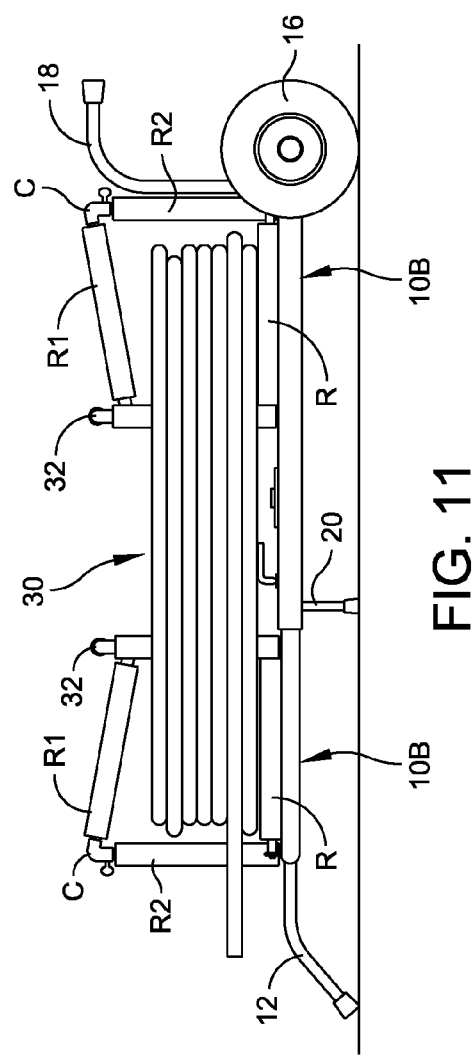

PIPE DISPENSER

RELATED CASE

Priority for this application is hereby claimed under 35 U.S.C. §119(e) to commonly owned and U.S. Provisional Patent Application No. 61/260,446 which was filed on Nov. 12, 2009 and which is incorporated by reference herein in its entirety.

TECHNICAL FIELD

The present invention relates in general to a pipe dispenser. More particularly, the present invention relates to a cart used for dispensing plastic piping or tubing.

BACKGROUND OF THE INVENTION

Plastic piping is provided in rolls that may be of different length, different size and different diameter. This pipe material is used for a great number of different applications including underground service. It is typical for the roll to be held together by being taped around the roll at certain intervals. When the roll is to be used, the tape is removed. A problem associated with handling the roll is that, once the tape is removed, the roll tends to unwind quickly in a somewhat uncontrollable manner. That makes the overall handling of rolls of this type quite difficult, thus a need for a support system that can be used for holding and dispensing the roll material.

Accordingly, it is an object of the present invention to provide a pipe or tubing dispenser that is particularly adapted for assisting in an unwinding of the roll of pipe or tubing.

Another object of the present invention is to provide a portable cart apparatus that functions as a dispenser for rolls of piping and that can furthermore support a spool of wire or the like that can be dispensed concurrent with the dispensing of the piping.

A further object of the present invention is to also provide an improved spool structure for support of a spool of wire or the like.

SUMMARY OF THE INVENTION

The foregoing and other objects are realized in accordance with the present invention by providing an apparatus that supports and dispenses a pipe roll. The apparatus comprises a frame that includes opposite one and other frame ends; a first pair of rollers that are spacedly disposed and mounted at the one end of the frame and a second pair of rollers that are spacedly disposed and mounted at the other end of the frame. The second pair of rollers are disposed in spaced relationship to the first pair of rollers. The first and second pairs of rollers all extend substantially in parallel to each other and define a circular locus with corresponding support points for the pipe roll.

In accordance with other aspects of the present invention there is included a third pair of rollers that are disposed orthogonal to the first pair of rollers and disposed outboard of the first pair of rollers; including a fourth pair of rollers that are disposed orthogonal to the second pair of rollers and disposed outboard of the second pair of rollers; wherein the frame includes a pair of elongated support pieces that extend from the one end to the other of the frame, and including adjustment means that enable the pair of elongated support pieces to be adjustable in length; including means for supporting a wire spool between the pair of elongated support pieces; wherein the frame includes opposite end support sections for the respective first and second pairs of rollers, and including adjustment means that enable the opposite end support pieces to be adjustable in length; wherein the adjustment means includes a single support strut; including means for supporting a wire spool from the single support piece; including a cutting mechanism that is mounted for engagement with a tape that binds the pipe roll; wherein the frame includes a frame strut for supporting the cutting mechanism; wherein the frame also includes a base having the pipe roll resting thereover and further including a third pair of rollers that are disposed orthogonal to the first pair of rollers supported from the frame base and a fourth pair of rollers that are disposed orthogonal to the second pair of rollers supported from the frame base; wherein all of the third and fourth pairs of rollers are disposed in a single plane; including at least one fifth roller spaced outwardly from and in parallel to the first pair of rollers; including at least one sixth roller spaced outwardly from and in parallel to the second pair of rollers; including a seventh roller releasable attached with the fifth roller and separable to enable the pipe roll to be mounted; including an eighth roller releasable attached with the sixth roller and separable to enable the pipe roll to be mounted; including a third pair of rollers releasably attached with the first pair of rollers outboard thereof; including a fourth pair of rollers releasably attached with the second pair of rollers outboard thereof; wherein one roller of the third pair is releasable from the other roller of the third pair; and wherein one roller of the fourth pair is releasable from the other roller of the fourth pair.

In accordance with another embodiment of the present invention there is provided a free standing apparatus for the support and dispensing of a spool of material comprising: a main support structure; a base secured to the main support structure; a lower spool support including a lower conical support section; an upper spool support including an upper conical support section; and an attachment rod that engages between the lower spool support and the base. The free standing apparatus allows support of the spool while enabling the spool to be held in place and yet freely rotatable as the material is unwound from the spool.

In accordance with still another embodiment disclosed herein there is provided an apparatus for supporting and dispensing a pipe roll in which the apparatus comprises a frame that includes opposite one and other frame ends; a set of rollers that are spacedly disposed and mounted in an upright manner from the frame; a first pair of rollers that are spacedly disposed from each other and mounted at the frame extending substantially transverse to the set of rollers; and a second pair of rollers being disposed in spaced relationship to said first pair of rollers. The second pairs of rollers are pivotal relative to the set of rollers. The frame preferably has side pieces that have slots for receiving forks of a fork lift. The first pair of rollers preferably extend respectively parallel to the side pieces and slightly outboard of the side pieces, while the second pair of rollers preferably are disposed at a top end of the set of rollers, and the second pair of rollers hinge at one end.

DESCRIPTION OF THE DRAWINGS

Numerous other objects, features and advantages of the present invention should now be apparent upon a reading of the following detailed description which is taken in conjunction with the accompanying drawings, in which:

FIG. 11 is a side elevation view of the apparatus of FIG. 10;

FIG. 12 is also a side elevation view of the apparatus of FIG. 10 but showing the cart in an upright position;

DETAILED DESCRIPTION

Figure 1:
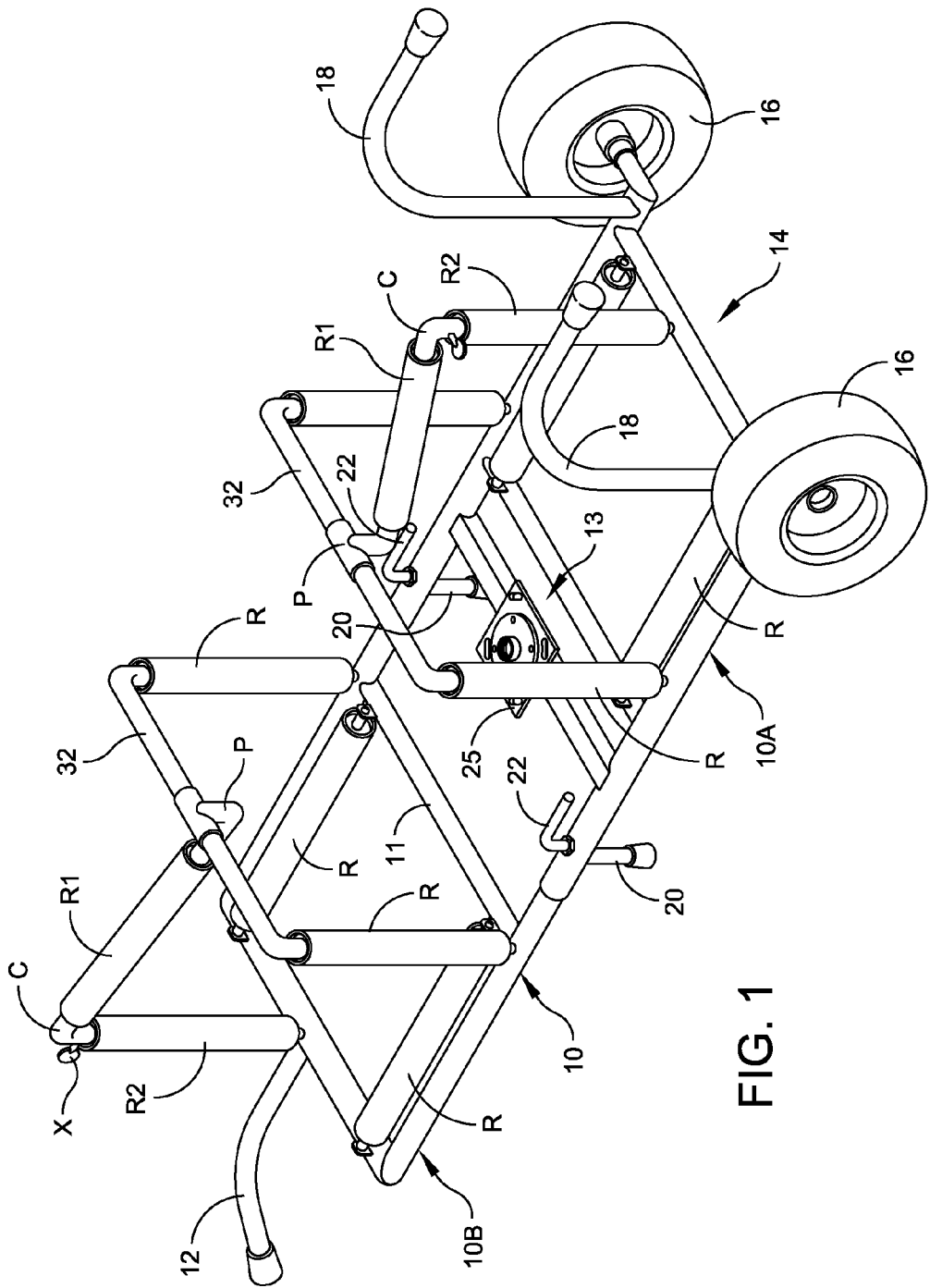
FIG. 1 is a perspective view of the supporting and dispensing apparatus of the present invention and illustrating the apparatus without any roll yet in place.
Figure 2:
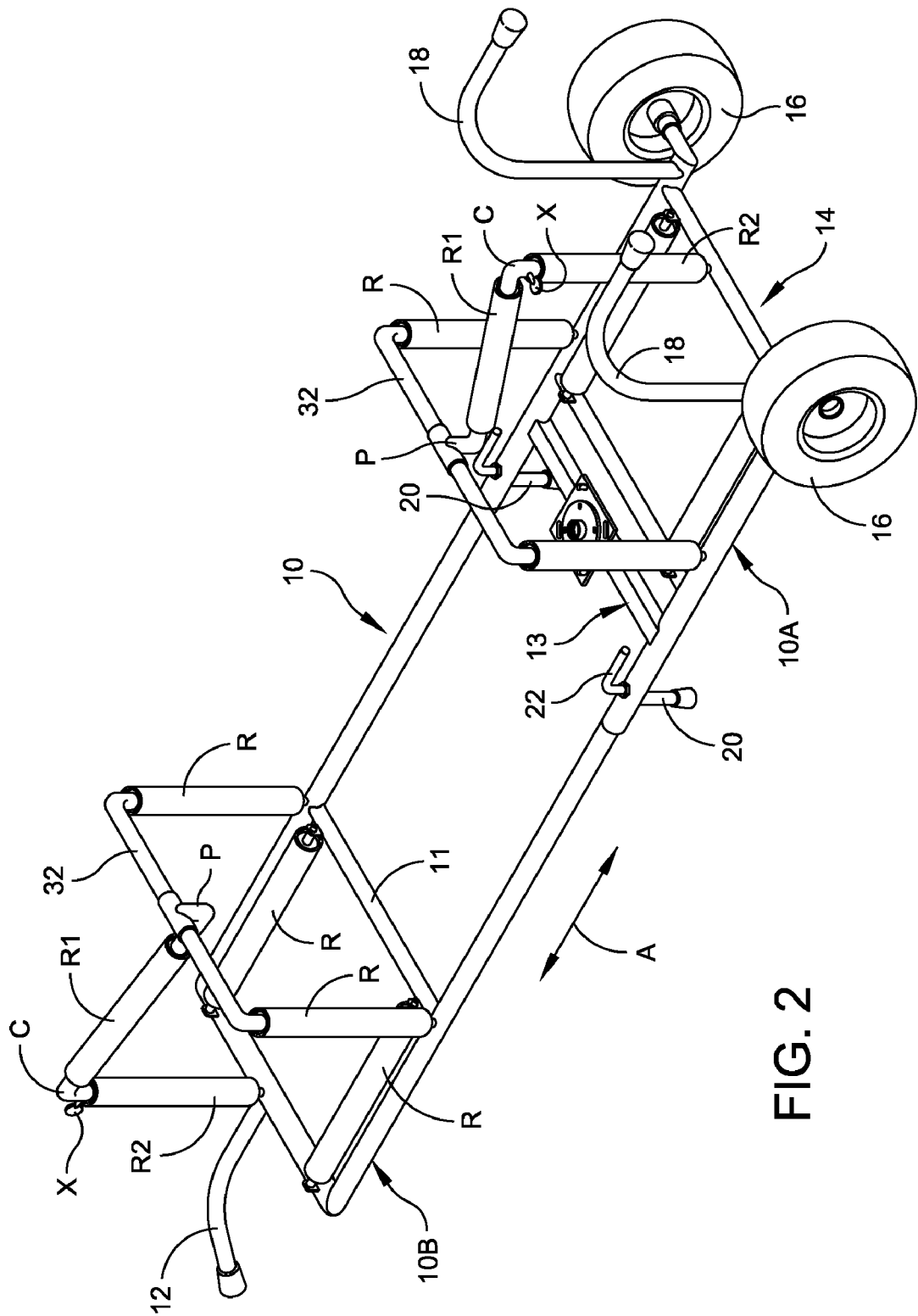
FIG. 2 is a perspective view similar to that shown in FIG. 1 but further illustrating the manner in which different sections of the apparatus may be moved in a telescoping manner so as to accommodate rolls of different diameter.
Figure 3:
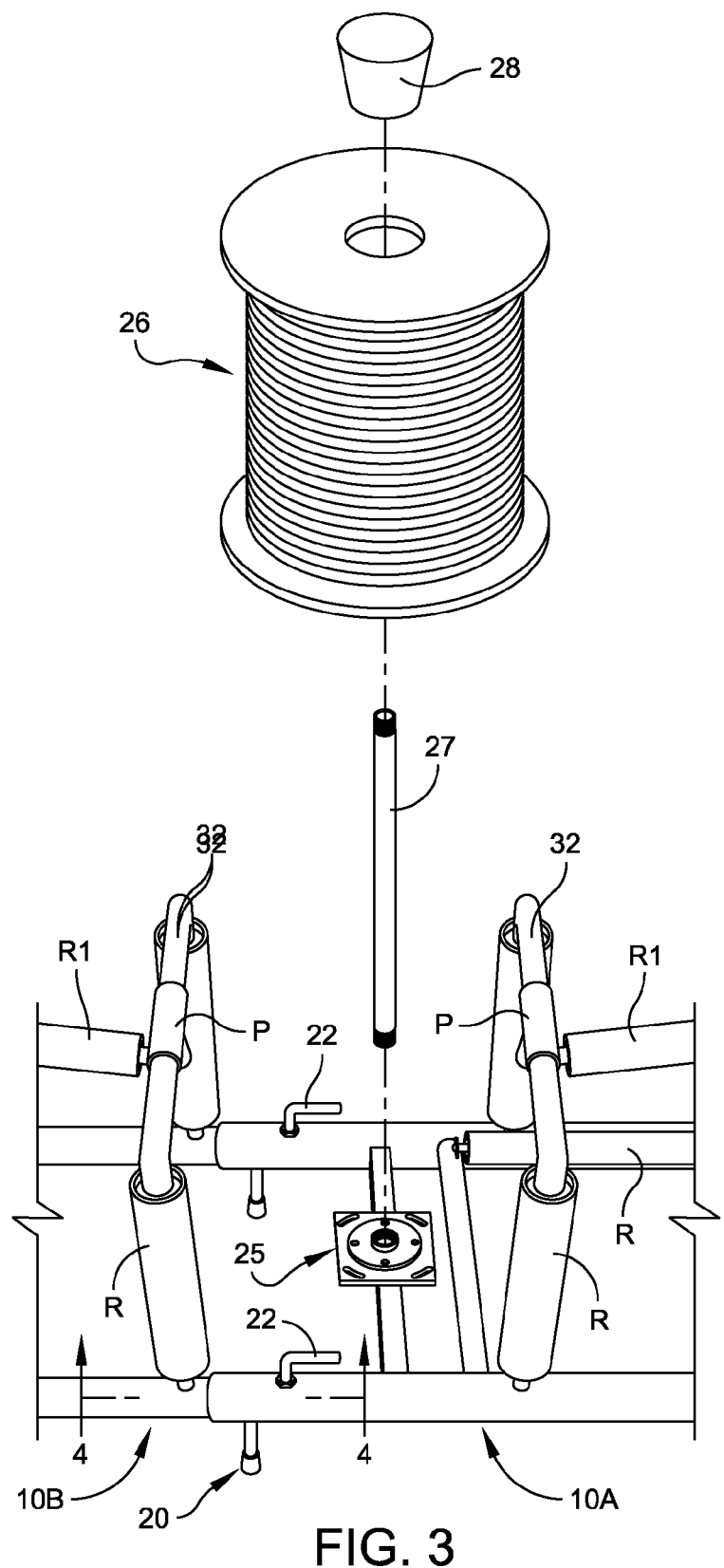
FIG. 3 is a perspective fragmentary view of the apparatus illustrated in FIGS. 1 and 2 and furthermore illustrating the use of a spool of wire associated with the apparatus.

Reference is now made to the drawings and initially to FIGS. 1-3 for a first embodiment of the present invention. Refer also to a second embodiment of the present invention shown in FIGS. 14-24. FIG. 1 is a perspective view of one embodiment of the supporting and dispensing apparatus of the present invention and illustrating the apparatus without any roll yet in place. FIG. 2 is a perspective view similar to that shown in FIG. 1 but further illustrating the manner in which different sections of the apparatus may be moved in a telescoping manner so as to accommodate rolls of different diameter. FIG. 3 is a perspective fragmentary view of the apparatus illustrated in FIGS. 1 and 2 and furthermore illustrating the use of a spool of wire associated with the apparatus. Other details of the first embodiment are explained in FIGS. 4-13.

The pipe dispenser of the present invention is illustrated herein in the form of a mobile cart. However, it is anticipated that the pipe dispenser may also take on other forms such as one in which four wheels are used instead of the two-wheel arrangement illustrated in the drawings. Also illustrated herein is an apparatus that can be towed behind a vehicle such as a pick-up truck, as in FIG. 21. The apparatus of the present invention can have opposed free-standing positions, one that may be considered as a vertical position and one that may be considered as a horizontal position. A vertical position may be that illustrated in FIG. 12, 14, or 21. A horizontal position may be that illustrated in FIG. 10, 11, or 20. Preferably, the pipe support apparatus is used in a stationary manner, and the pipe is dispensed therefrom.

The dispensing apparatus of the present invention, as specifically illustrated herein, in both embodiments that are disclosed, includes a basic frame member. In the first embodiment shown in FIGS. 1-13, there is provided a substantially rectangular frame 10 that may be considered as separated into a bottom frame section 10A and a top frame section 10B. These frame sections 10A and 10B are constructed so that they telescope one into the other. FIG. 1 shows the sections in a more closed position, while FIG. 2 shows the sections 10A and 10B in a more open position. In FIG. 2 the arrow A indicates the manner in which the section 10B may be slid relative to the section 10A between opened and closed positions. These separate sections can then be secured in whatever position is desired and based on the size of the particular pipe roll.

Regarding the sections 10A and 10B, these can both be constructed of a metal or heavy plastic tubular material. The separate sections that comprise the frame may be connected together in any one of a number of different ways such as by welding the different sections together where they join. The construction of the frame is considered as of conventional design and well within the skill of one skilled in the art. The section 10B preferably includes a center-mounted extending handle 12. The section 10A may be considered as including an axle 14 from which the separate wheels 16 are conventionally mounted. The axle and wheel arrangement is also considered as of conventional design. The frame section 10A also includes upright angular pieces 18 that provide support legs so that the apparatus can be, in particular, supported at an upright position such as the position illustrated in FIG. 12. Each of the pieces 18 are constructed with a substantially right angle bend as shown in FIG. 12. The frame section 10A also has a spaced set of legs 20. These legs 20 enable the cart apparatus to also be set in a flat position such as illustrated in FIG. 11. In FIG. 11 it is also noted that the handle 12 is constructed so that when the legs 20 are on a ground surface, the end of the handle 12 is similarly on or close to the ground surface to provide further stability to the cart apparatus.

Figure 4:
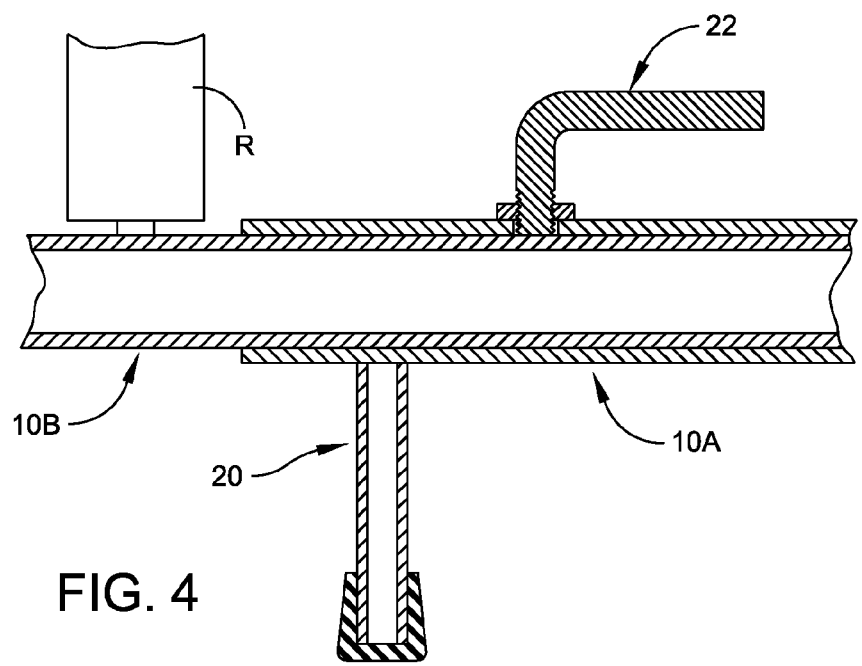
FIG. 4 is a cross-sectional view taken along line 4-4 of FIG. 3.
Figure 5:
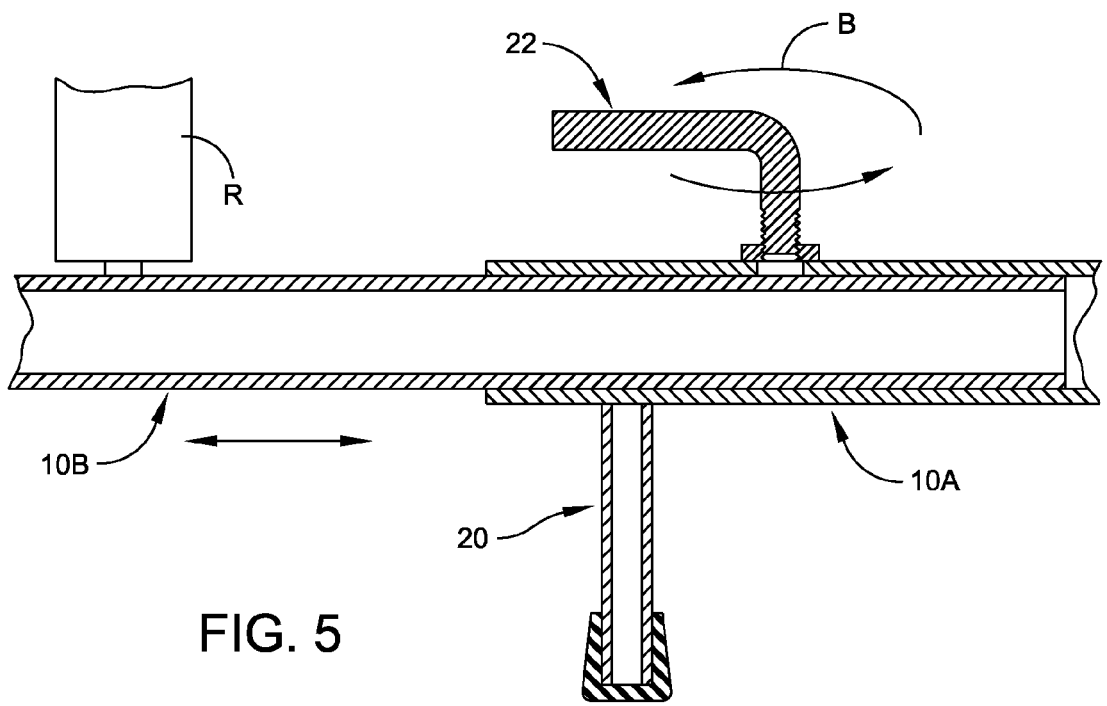
FIG. 5 is a cross-sectional view, like that illustrated in FIG. 4, and showing a slide lock in its locked position.

As mentioned previously, the frame sections 10A and 10B telescope relative to each other. This is clearly illustrated in the cross-sectional views of FIGS. 4 and 5 wherein the section 10B is telescoping inside of the section 10A. In order to lock the cart in a particular position, there is also provided locking levers 22. FIG. 4 shows the locking lever 22 in a locked position while FIG. 5 shows the locking lever 22 rotated by means of arrows B to its released position. In the locked position then the respective sections 10A and 10B are fixed in position relative to each other. Preferably, there are two locking levers 22 as depicted in FIGS. 1-3. Various types of lock arrangements can be provided. Usually, the lock is activated once the roll is in position on the apparatus and the sections have been separated to the proper spacing so that the roll is properly positioned such as in the position illustrated in FIG. 10.

Figure 10:
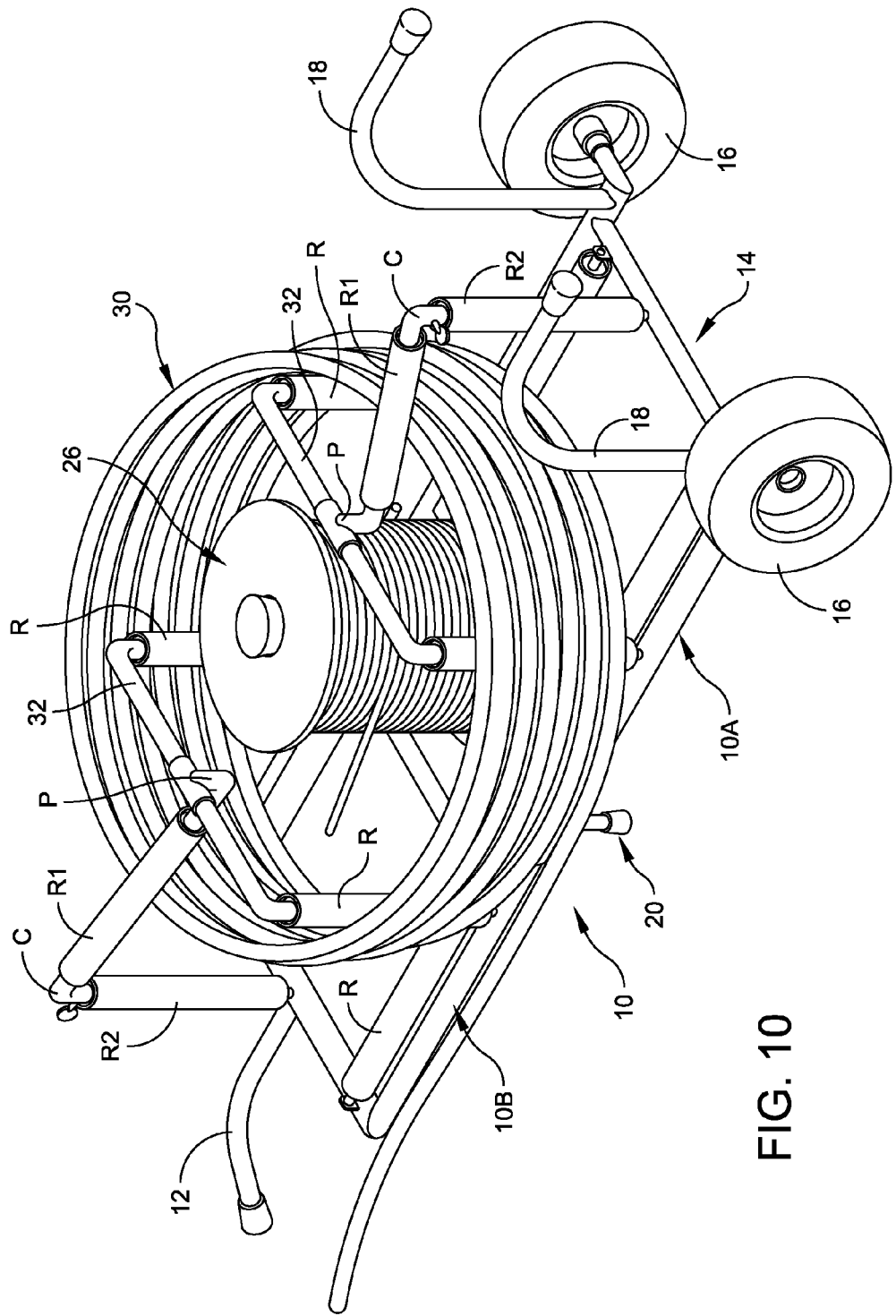
FIG. 10 is a perspective view similar to that shown in FIG. 1 but furthermore illustrating the placement of a roll of pipe and a spool of wire.
Figure 13:
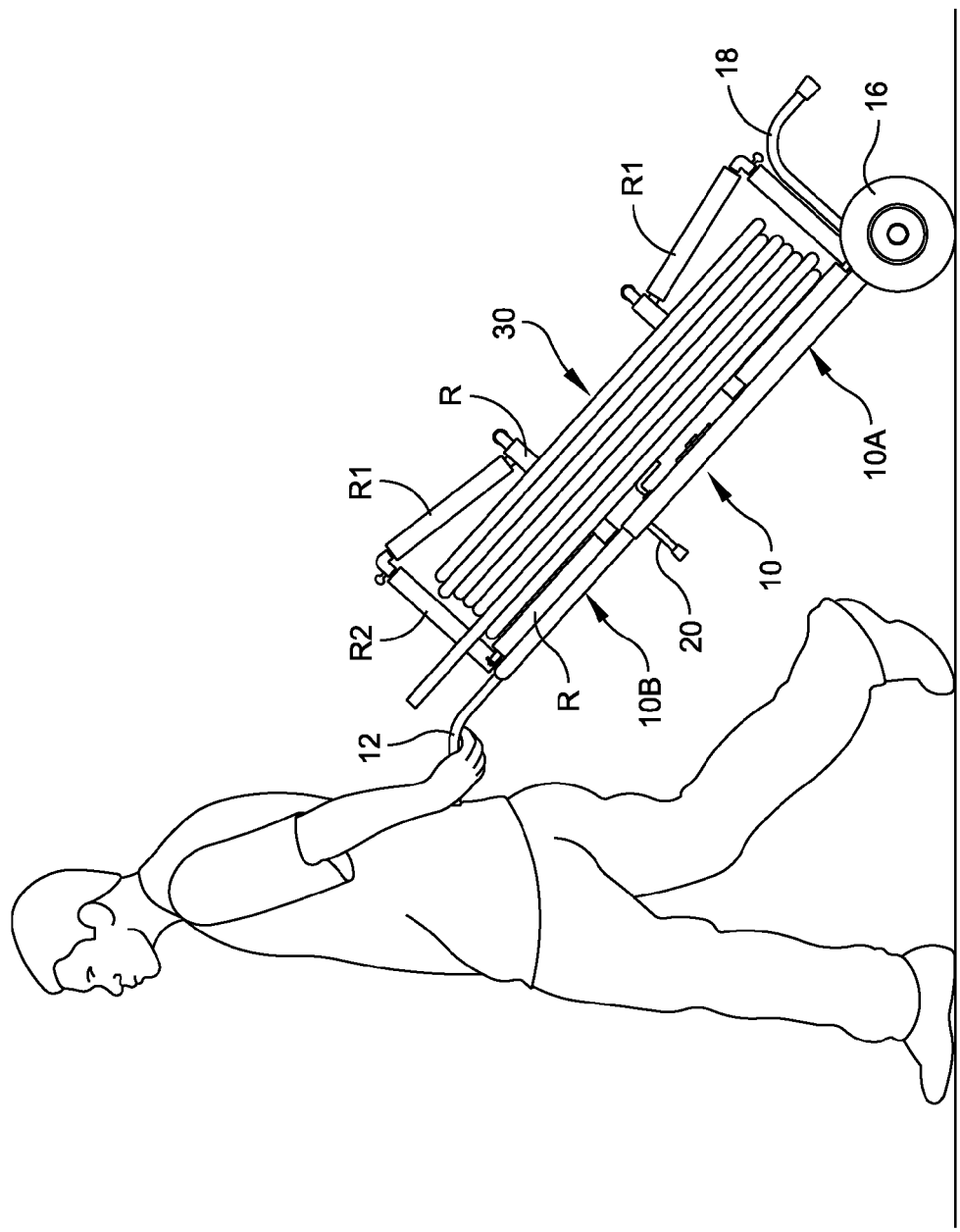
FIG. 13 is a side elevation view showing a user handling the apparatus.

It is also noted that the frame of the apparatus includes support cross pieces. This includes a cross piece 11 associated with the top frame section 10B and at least one cross piece 13 that is associated with the bottom frame section 10A. It is the cross piece 13 that supports a square-shaped base 25. The base 25 is for support of the wire spool 26. In this regard refer to the exploded perspective view of FIG. 3 which shows the wire spool 26 exploded away from the base 25. The spool of wire may also be supported by means of an end threaded pipe 27 and a top securing nut 28. The spool of wire is meant to be unraveled at the same time as the plastic piping in performing a certain task. Being able to support this at the center area of the piping is advantageous. Refer to FIG. 10 that illustrates the spool 26 as mounted essentially coaxially with the roll 30.

Figure 8:
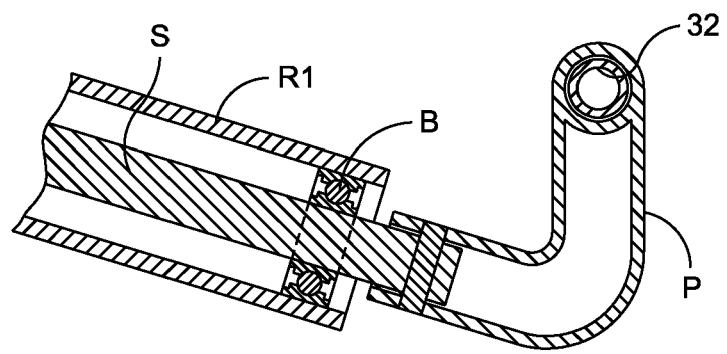
FIG. 8 is a cross-sectional view taken along line 8-8 of FIG. 6.
Figure 9:
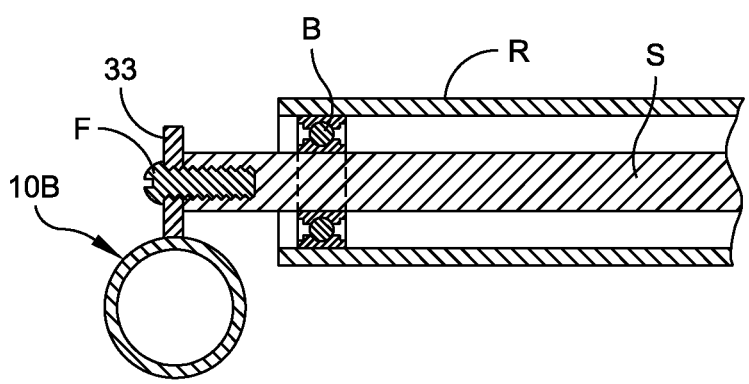
FIG. 9 is a cross-sectional view taken along line 9-9 of FIG. 6.

The pipe dispensing apparatus that is illustrated herein is also comprised of a series of rollers. FIGS. 7, 8 and 9 illustrate these rollers R in various cross-sectional views. FIG. 7 is a cross-sectional view taken along line 7-7 of FIG. 6. FIG. 8 is a cross-sectional view taken along line 8-8 of FIG. 6. FIG. 9 is a cross-sectional view taken along line 9-9 of FIG. 6. Each of the rollers R is typically supported by means of bearings B that are supported about a main shaft S. Several of the rollers, particularly the lower mounted rollers depicted in FIG. 1 are fixed in position but are readily rotatable so that when the roll of pipe material 30 is dispensed, the pipe material can easily move over these rollers in a substantially frictionless manner. As a matter of fact, all of the rollers that are depicted associated with the apparatus have some type of bearing or bushing means that enable these rollers to readily rotate on their associated respective shafts.

Figure 6:
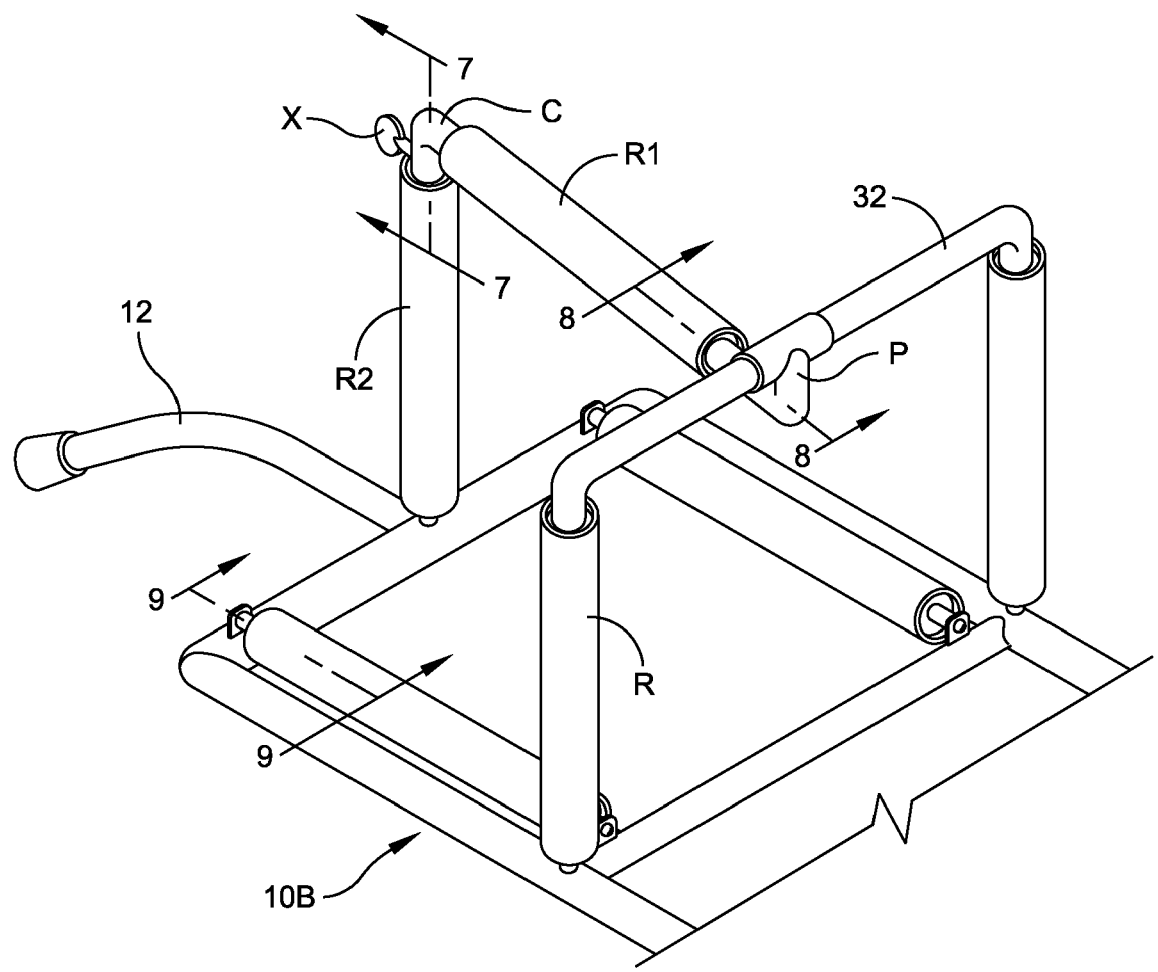
FIG. 6 is a further fragmentary perspective view of the apparatus illustrated in FIG. 1 at the handle end of the apparatus.
Figure 7:
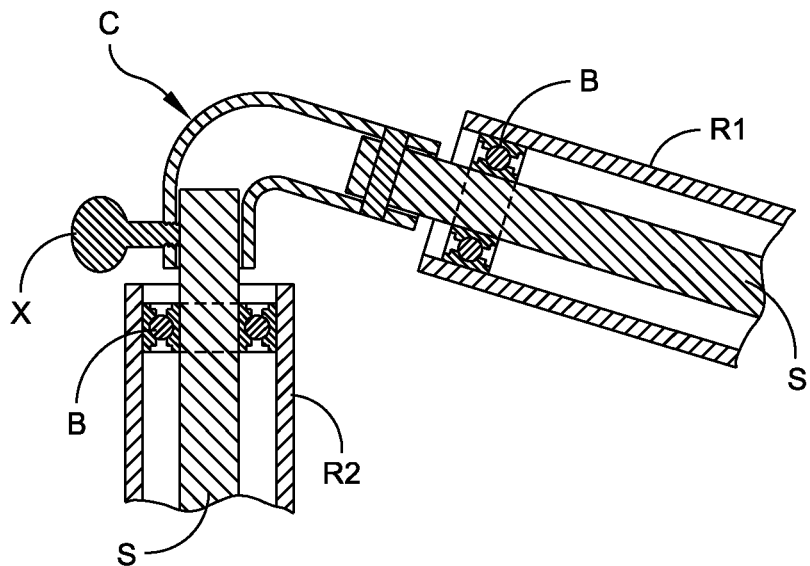
FIG. 7 is a cross-sectional view taken along line 7-7 of FIG. 6.

FIG. 7 is a cross-sectional view taken along line 7-7 of FIG. 6 and illustrates an area where a connector C is used. This arrangement enables the roller R1 to be lifted at the connector C relative to the roll R2. The roll R1 and its associated connector C may be held in place by means of the lock screw X.

The opposite end of the roll R1 is illustrated in the cross-sectional view taken along line 8-8 of FIG. 6. This illustrates a pivot member P that is adapted to be pivotally engaged about the cross bar 32 as illustrated in FIG. 6. Thus, one end of the roll R1 is pivotal at pivot member P while the other end of the roll R1 at connector C may be locked and unlocked relative to the roll R2. The cross-sectional view of FIG. 9 is taken along line 9-9 of FIG. 6 and shows the usual support for any one of the lower positioned rollers R. FIG. 9 illustrates the frame section 10B and a tab 33 used for the support of the roller R depicted in FIG. 9. The tab 33 is fixed to the tubular section 10B and is secured to the roller R by means of a fastener F.

Thus, each of the frame sections 10A and 10B support six rollers, three of which are disposed substantially horizontally and three of which are disposed substantially vertically. These rollers together essentially capture the roll 30 and restrict its motion, in both frame sections, to the area between these respective six rollers. Refer, for example, to FIG. 10 that shows a roll 30 supported on the frame 10. Each of these sections 10A, 10B includes two lower positioned rollers upon which the roll 30 is supported with these rollers providing a support surface that enables the roll 30 to be easily rotated as the pipe material is dispensed from the roll 30. Each of the cross bars 32 also support two vertically disposed rollers R that respectively extend from the cross bar 32 to the base of the frame 10. These rollers R are also supported to be readily rotatable. This leaves, in each section, a further pair of rollers that have been previously designated as rollers R1 and R2. The roller R2 is meant to be rotatable but vertically stationery. It is only the roller R1 that is movable at its pivot member P and that can be connected and disconnected at the connector C with the roller R2. This disconnection is used when a new pipe roll 30 is to be positioned on the apparatus.

Thus, with the apparatus in the position as shown in, for example, FIG. 1 or 2, the locking levers 22 are released so that the frame can be telescoped apart or together. This telescoping is used for the purpose of adjusting the separation between the rollers to match the particular size roll that is to be supported about the main rollers. The drawings illustrate the roll 30 being contacted primarily by the four upright center supported rollers R as clearly depicted in FIG. 10. Thus, these four rollers are disposed inside of the roll 30 while the other rollers including the horizontally disposed rollers as well as rollers R1 and R2 are essentially disposed under or outside of the roll 30. When a new roll 30 is to be supported on the apparatus, the connector C is unlocked and both of the rollers R1 are lifted out of the way so as to provide a space between the cross bar 32 and the upright roller R2. The roll 30 may then be mounted such as in the position of FIG. 10 about the four upright center-mounted rollers R. At the same time, and depending upon the diameter of the roll 30, the separate frame sections 10A and 10B may be adjusted so that the four upright rollers in the center are positioned snugly against the inside of the roll 30 such as is depicted in FIG. 10. When that position is reached between the frame sections 10A and 10B, then the lever 22 may be used to lock these two sections in that position. Also, once the roll is mounted, then the rollers R1 can be pivoted at pivot member P with the connector C engaged with the corresponding upright rollers R2. The lock screw X can then be used to secure the rollers R1 and R2 together. This leaves a confined space with essentially at least one roller on all sides of the roller pipe material.

An advantage of the apparatus of the present invention is the ability for the apparatus to be quite portable by means of the frame section, sections 10A and 10B with the corresponding handle 12 and wheels 16. This apparatus is typically used with another apparatus that is used to cut a channel in a ground surface into which the pipe material is to be disposed. For the most part the apparatus of the present invention is meant to be used in a stationery position, preferably the position shown in FIGS. 10 and 11. However, pipe material may also be dispensed from the roll 30 in a position even as illustrated in FIG. 12. Moreover, it is possible to dispense from the apparatus even when in motion such as in the position shown in FIG. 24.

Also disclosed herein is a slightly different version of the first embodiment in which the sections 10A and 10B are different primarily in that only a single center-arranged strut is used as shown in FIGS. 14-24. As far as the roller arrangement shown in FIGS. 1-13 is concerned, the same basic roller arrangement can be used with the single strut support arrangement. With the single strut arrangement the same telescoping structure can be used as illustrated in further detail hereinafter.

Figure 14:
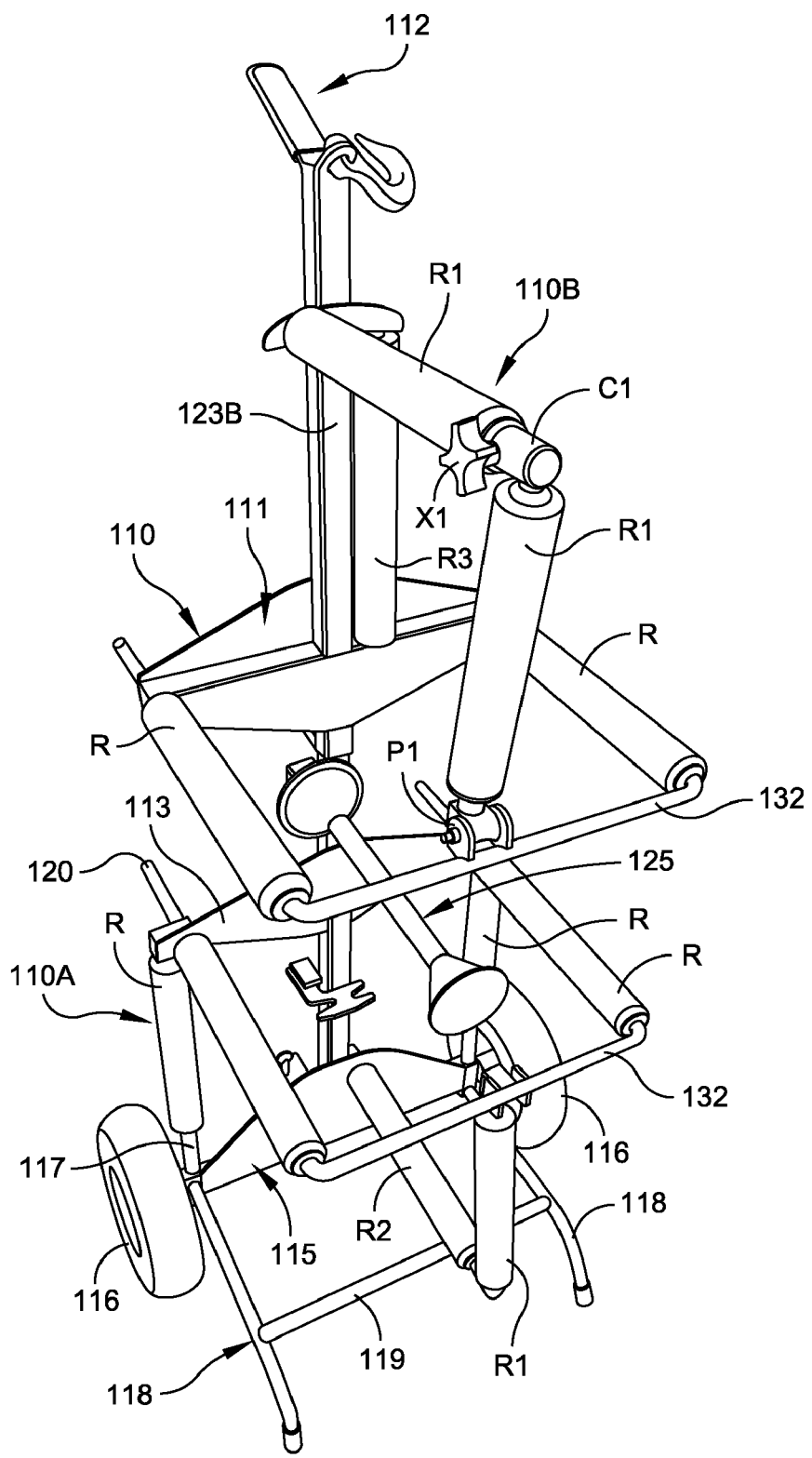
FIG. 14 is a perspective view of an alternate embodiment of the supporting and dispensing apparatus of the present invention and illustrating the apparatus in an upright position.
Figure 15:
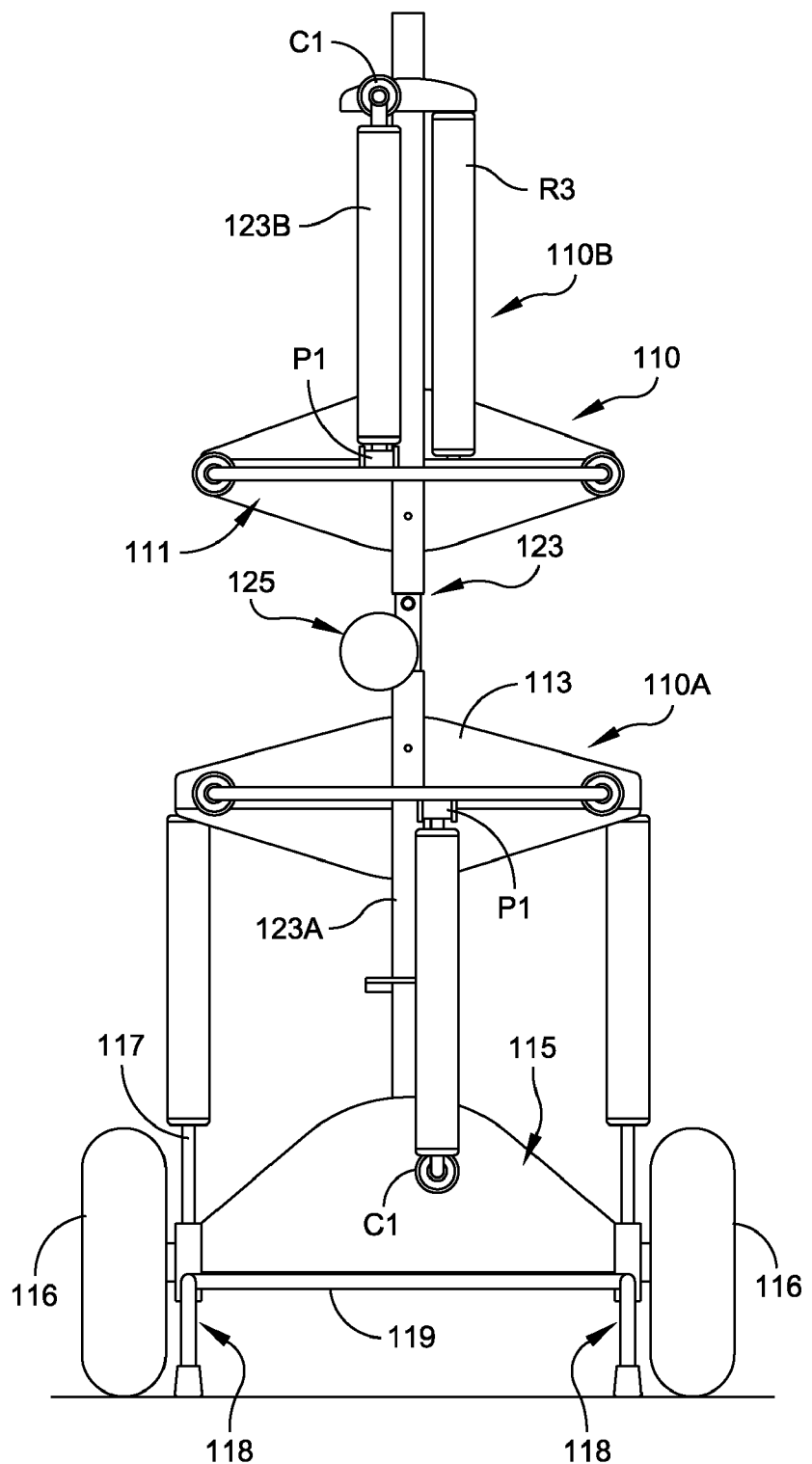
FIG. 15 is a front elevation view of the apparatus of FIG. 14.
Figure 16:
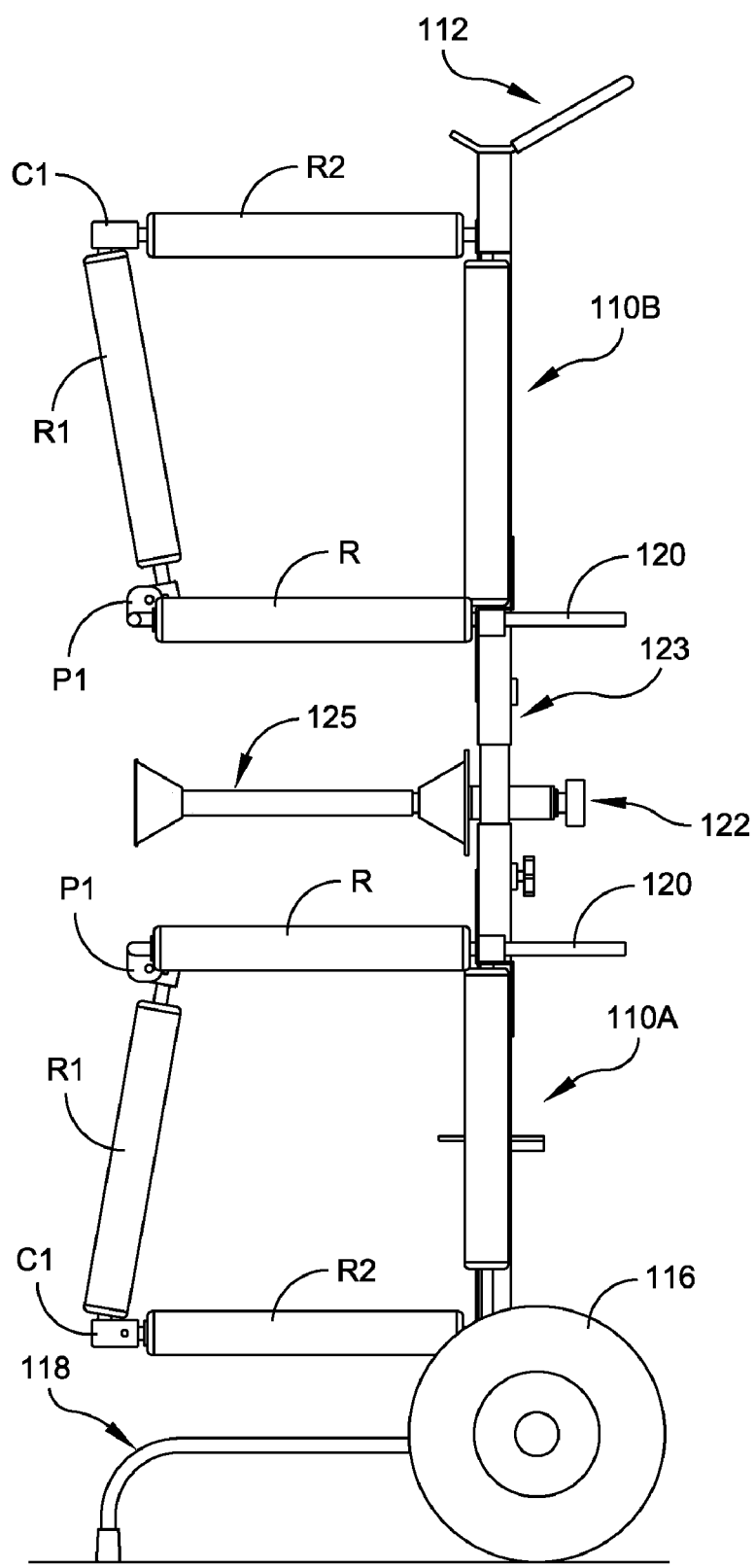
FIG. 16 is a side elevation view of the apparatus of FIG. 14.
Figure 17:
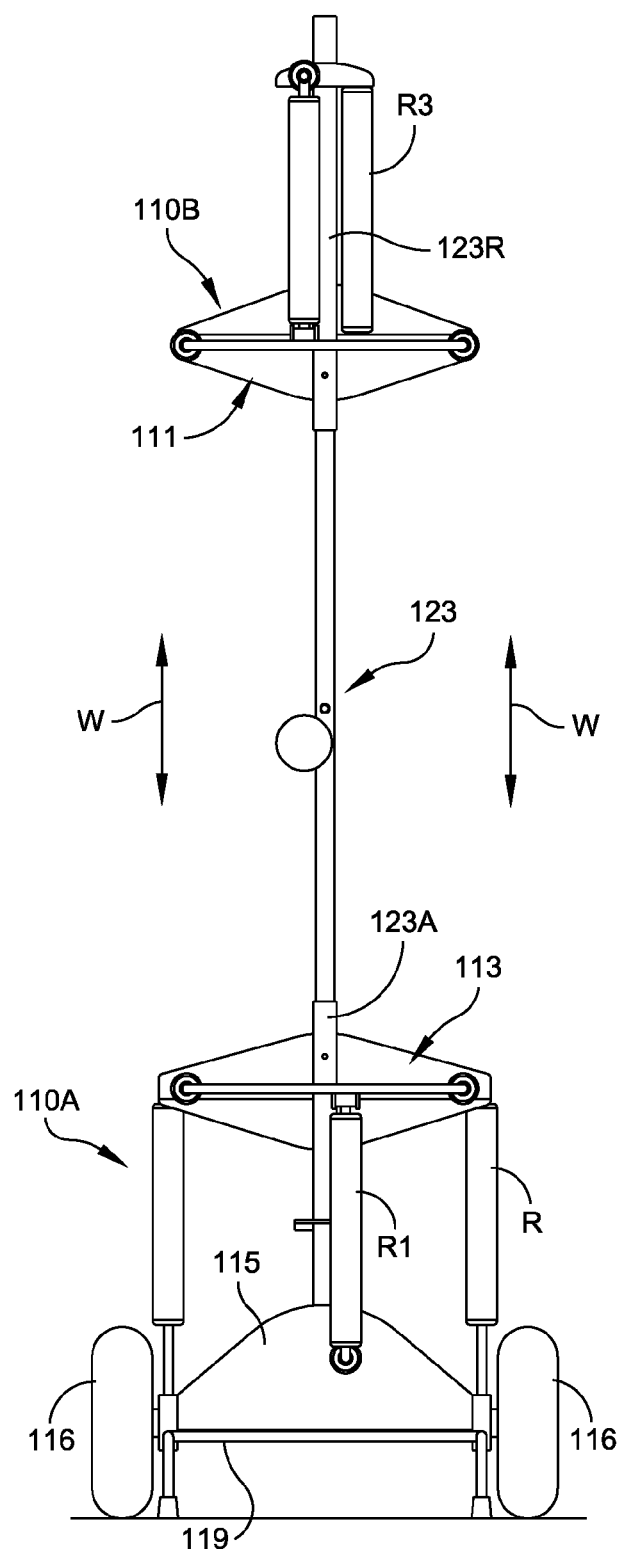
FIG. 17 is a front elevation view of the apparatus of FIG. 14 illustrating opposite support sections being adjustable.

In this second embodiment shown in FIGS. 14-24 there is again provided a substantially rectangular frame 110 that may be considered as separated into a bottom frame section 110A and a top frame section 110B. These frame sections 110A and 110B are constructed so that they telescope one into the other. FIG. 15 shows the sections in a more closed position, while FIG. 17 shows the sections 110A and 110B in a more open position. In FIG. 17 the arrow W indicates the manner in which the section 110B may be slid relative to the section 110A between opened and closed positions. These separate sections can then be secured in whatever position is desired and based on the size of the particular pipe roll. A lock for fixedly securing the sections together can be provided as shown in the first embodiment that was previously described herein.

Figure 23:
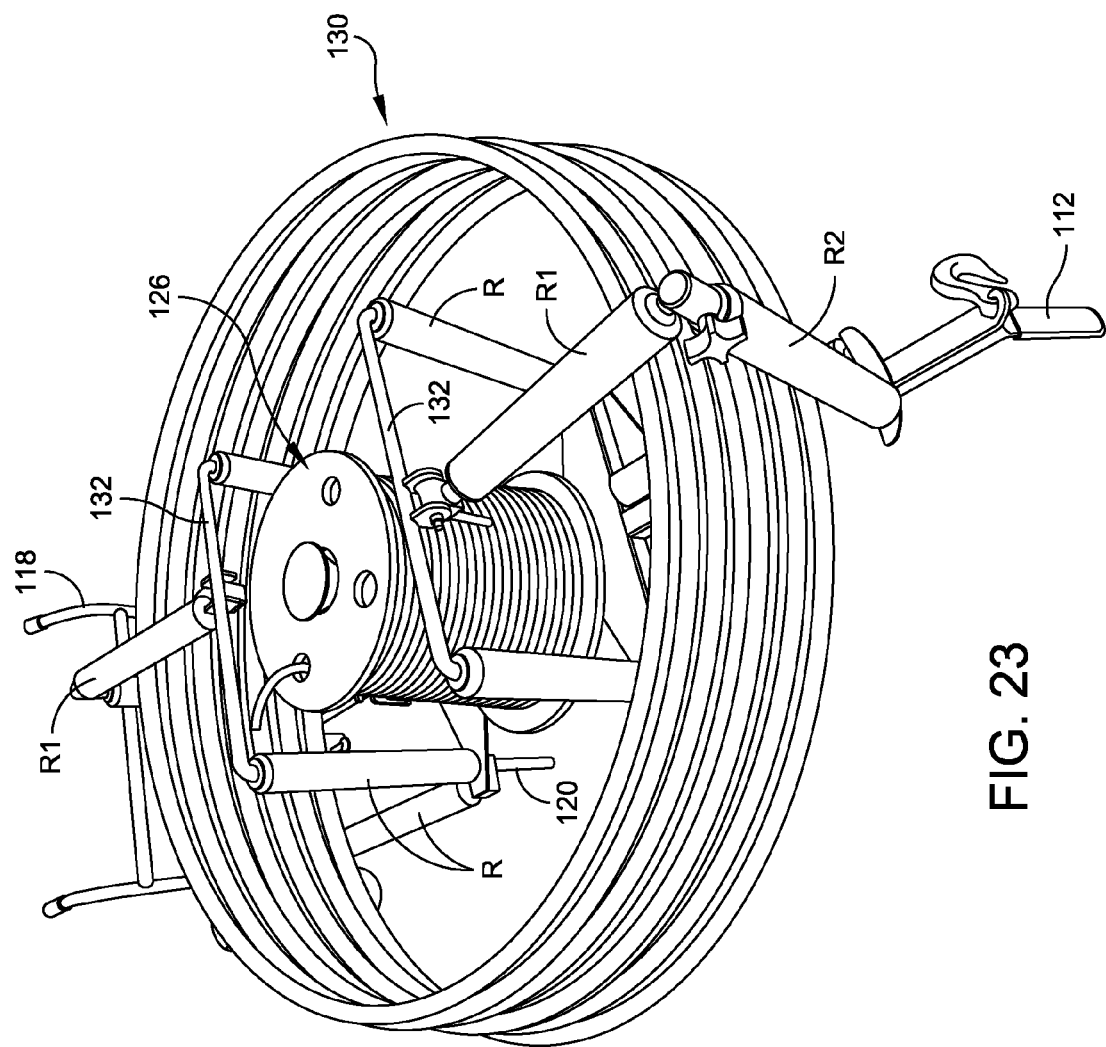
FIG. 23 is a perspective view of the apparatus of FIG. 14 with a pipe roll and wire spool supported thereby.
Figure 24:
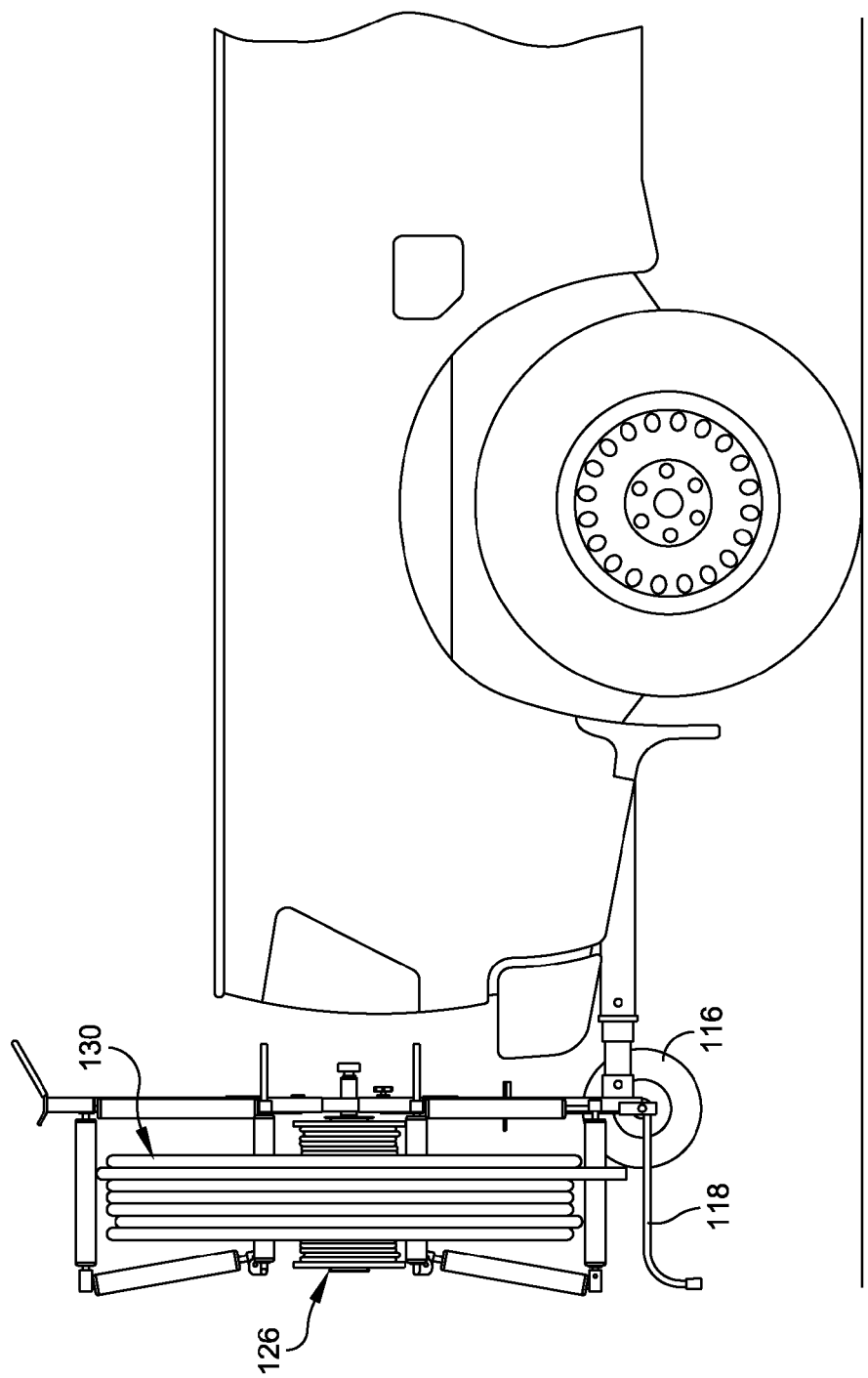
FIG. 24 is a side elevation view illustrating the manner in which the apparatus of the present invention is supported from a truck.

Regarding the sections 110A and 110B, these can both be constructed of a metal or heavy plastic tubular material. The separate sections that comprise the frame may be connected together in any one of a number of different ways such as by welding the different sections together where they join. The construction of the frame is considered as of conventional design and well within the skill of one skilled in the art. The section 110B preferably includes a center-mounted extending handle 112. The section 110A may be considered as including an axle 114 (see FIG. 19) from which the separate wheels 116 are conventionally mounted. The axle and wheel arrangement is also considered as of conventional design. The frame section 110A also includes upright angular pieces 118 that provide support legs so that the apparatus can be, in particular, supported at an upright position such as the position illustrated in FIG. 16. Each of the pieces 118 are constructed with a substantially right angle bend as shown in FIG. 16. A cross bar 119 is shown extending between the pieces 118 to enhance the support strength. The frame sections 110A, 110B may also be provided with a spaced set of legs 120. These legs 120 enable the cart apparatus to also be set in a flat position such as illustrated in FIG. 23. In FIG. 23 it is also noted that the handle 112 may be constructed so that when the legs 120 are on a ground surface, the end of the handle 112 is similarly on or close to the ground surface to provide further stability to the cart apparatus when the roll is in a substantially horizontal position.

As mentioned previously, the frame sections 110A and 110B telescope relative to each other. This is clearly illustrated in FIGS. 15 and 17 wherein the section 110B is telescoping relative to the section 110A. In the first embodiment illustrated herein a pair of support members extended lengthwise and are adjustable to position the separate frame sections together or apart. Instead, in this second embodiment a single center strut 123 is used that is adjustable in length as illustrated by the double arrows W in FIG. 17. In order to lock the cart in a particular position, there is also preferably provided a locking lever, or the like. In the locked position then the respective sections 110A and 110B are fixed in position relative to each other. Various types of lock arrangements can be provided. Usually, the lock is activated once the roll is in position on the apparatus and the sections have been separated to the proper spacing so that the roll is properly positioned such as in the position illustrated in FIG. 20. A lock like that illustrated in FIGS. 4 and 5 may be employed.

It is also noted that the frame of the apparatus includes support cross pieces. This includes a cross piece 111 associated with the top frame section 110B and at least one cross piece 113 that is associated with the bottom frame section 110A. These cross pieces can be appropriately attached with other members to provide a complete frame structure. For example the lower rollers (per FIG. 23) are supported on support rods 117 (see FIGS. 14 and 15) that can interconnect between cross piece 113 and end cross piece 115. The section 110A also includes a center rail 123A that interconnects cross pieces 113 and 115. The section 110B also includes a central rail 123B that connects between the cross piece 111 and the handle 112. A single roller R3 is disposed beside the rail 123B, as depicted in FIG. 14. The center rail 123A also supports the cutting mechanism 131. See FIGS. 18 and 19.

It is the strut 123 that supports member 125. Member 125 is for support of the wire spool 126. In this regard refer to the perspective view of FIG. 23 which shows the wire spool 126 in place on the member 125. The spool of wire may also be supported by means of an end threaded pipe and a top securing nut, or the like. The spool of wire is meant to be unraveled at the same time as the plastic piping in performing a certain task. Being able to support this at the center area of the piping is advantageous. Refer to FIG. 23 that illustrates the spool 126 as mounted essentially coaxially with the roll 130. Various supports can be provided for the spool 126 that typically include a center support post and an end piece that is removable to allow the spool to be replaced. The form of spool support may be as illustrated in, for example, FIG. 3. However, refer to preferred support versions as shown in FIGS. 14 and 23, as well as in more detail in FIGS. 25-35 which are described in further detail hereinafter.

The pipe dispensing apparatus that is illustrated herein is also comprised of a series of rollers. FIGS. 14-17 illustrate these rollers R. Each of the rollers R is typically supported by means of bearings B that are supported about a main shaft S. Several of the rollers, particularly the rollers close to the base of the frame are fixed in position but are readily rotatable so that when the roll of pipe material 130 is dispensed, the pipe material can easily move over these rollers in a substantially frictionless manner. As a matter of fact, all of the rollers that are depicted associated with the apparatus have some type of bearing or bushing means that enable these rollers to readily rotate on their associated respective shafts. In the second embodiment illustrated herein essentially the same support arrangements can be used for each of the rollers, as previously described in the first embodiment. In this regard refer to the cross-sectional views of FIGS. 7-9. The support for individual rollers is well within the purview of one skilled in the art.

FIG. 14 is a perspective view that illustrates an area where a connector C1 is used. This arrangement enables the roller R1 to be lifted at the connector C1 relative to the roller R2. The roller R1 and its associated connector C1 may be held in place by means of the lock screw X1. The rollers R1 and R2 are meant to be separated to enable the roll material 130 to be mounted on the apparatus. This separation occurs on both sides of the apparatus at respective sections 110A and 110B.

The opposite end of the roller R1 illustrates a pivot member P1 that is adapted to be pivotally engaged about the cross bar 132 as illustrated in FIG. 14. Thus, one end of the roller R1 is pivotal at pivot member P1 while the other end of the roller R1 at connector C1 may be locked and unlocked relative to the roller R2. Refer to the cross-sectional view of FIG. 9 as taken along line 9-9 of FIG. 6 that shows the usual support for any one of the lower positioned rollers R. FIG. 9 illustrates the frame section 10B and a tab 33 used for the support of the roller R depicted in FIG. 9. The tab 33 is fixed to the tubular section 10B and is secured to the roller R by means of a fastener F. A similar arrangement can be used in the second embodiment described herein.

Thus, each of the frame sections 110A and 110B support six rollers, three of which are disposed substantially horizontally and three of which are disposed substantially vertically. These rollers together essentially capture the roll 130 and restrict its motion, in both frame sections, to the area between these respective six rollers. Refer, for example, to FIG. 23 that shows a roll 130 supported on the frame 110. Each of these sections 110A, 110B includes two lower positioned rollers upon which the roll 130 is supported with these rollers providing a support surface that enables the roll 130 to be easily rotated as the pipe material is dispensed from the roll 130. Each of the cross bars 132 also support two vertically disposed rollers R that respectively extend from the cross bar 132 to the base of the frame 110. These rollers R are also supported to be readily rotatable. This leaves, in each section, a further pair of rollers that have been previously designated as rollers R1 and R2. The roller R2 is meant to be rotatable but vertically stationery. It is only the roller R1 that is movable at its pivot member P1 and that can be connected and disconnected at the connector C1 with the roller R2. This disconnection is used when a new pipe roll 130 is to be positioned on the apparatus.

Thus, with the apparatus in the position as shown in, for example, FIG. 23, the locking levers may be released so that the frame can be telescoped apart or together. This telescoping is used for the purpose of adjusting the rollers to the particular size roll that is to be supported on the rollers. FIG. 10 has previously illustrated the pipe roll being contacted primarily by the four upright center supported rollers R. When the pipe roll is in place the inside diameter of the roll is preferably held somewhat tightly against those four upright center rollers R. Thus, these four rollers are disposed inside of the roll while the other rollers including the horizontally disposed rollers as well as rollers R1 and R2 are essentially disposed under or outside of the pipe roll. When a new roll is to be supported on the apparatus, the connector C1 is unlocked and both of the rollers R1 are lifted out of the way so as to provide a space between the cross bar 132 and the upright roller R2. The roll 130 may then be mounted such as in the position of FIG. 23 about the four upright center-mounted rollers R. At the same time, and depending upon the diameter of the roll 130, the separate frame sections 110A and 110B may be adjusted so that the four upright rollers in the center are positioned snugly against the inside surface of the roll 130. When that position is reached between the frame sections 110A and 110B, then the locking lever may be used to lock these two sections in that position. Also, once the roll is mounted, then the rollers R1 can be pivoted at pivot member P1 with the connector C1 engaged with the corresponding upright rollers R2. The lock screw X1 can then be used to secure the rollers R1 and R2 together. This leaves a confined space with essentially at least one roller on all sides of the roller pipe material.

Once again considering the apparatus of the present invention, there are a series of rollers that are compactly arranged to provide the desires support for the pipe roll. This includes the aforementioned upright rollers R (refer to FIG. 1) at the center that provide the primary support for the inside diameter of the pipe roll. In addition, and still referencing FIG. 1 herein, there are four base rollers R set out essentially in a single plane and forming a base upon which the pipe roll rests, such as depicted in FIG. 10. This leaves the other rollers R1 and R2 that together provide for additional roll support. In particular, the rollers R2 essentially limit the outer unraveling of the pipe roll that might occur when a tape, which holds the pipe roll together, is cut. Also the separation occurs between both pairs of rollers R1 and R2 so as to enable a new pipe roll to be mounted on the apparatus.

Figure 18:
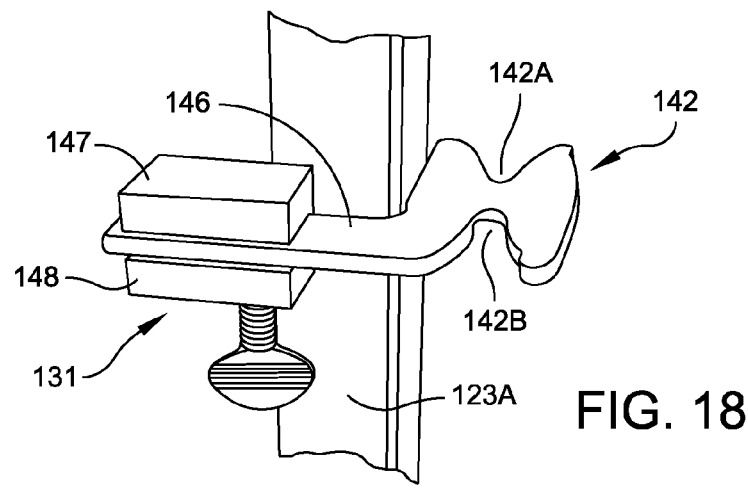
FIG. 18 is a fragmentary perspective view of a tape cutting member associated with the apparatus of the present invention.
Figure 19:
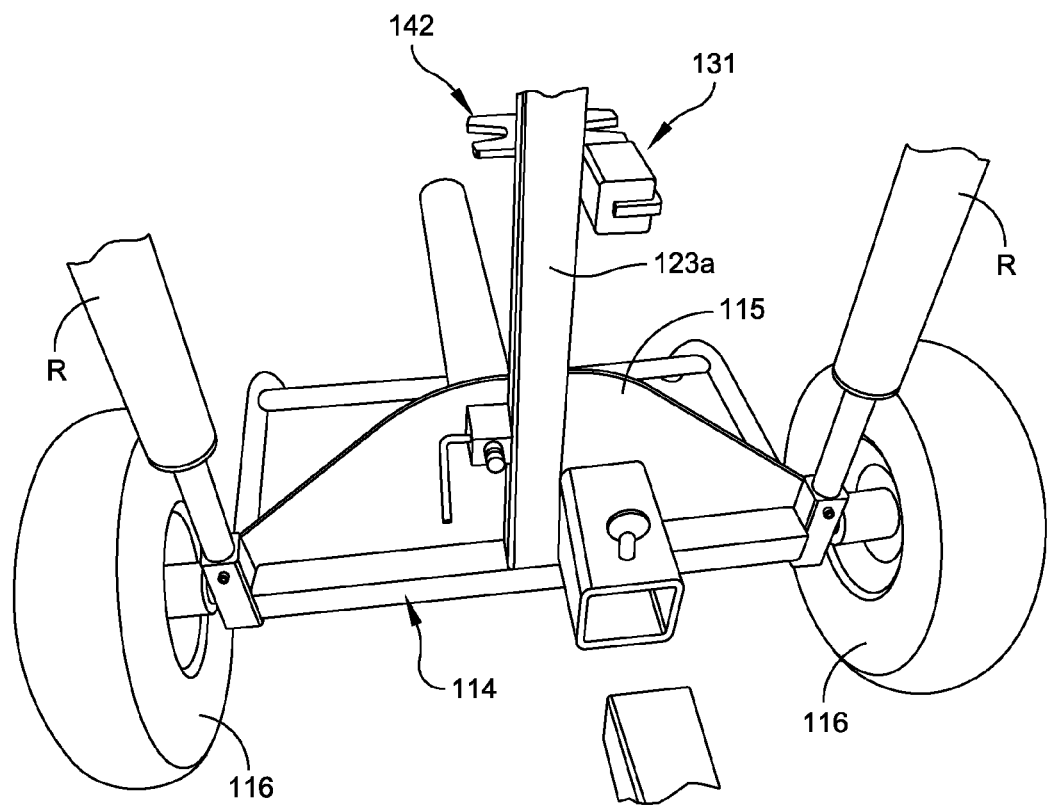
FIG. 19 is a further fragmentary perspective view of the apparatus.
Figure 20:
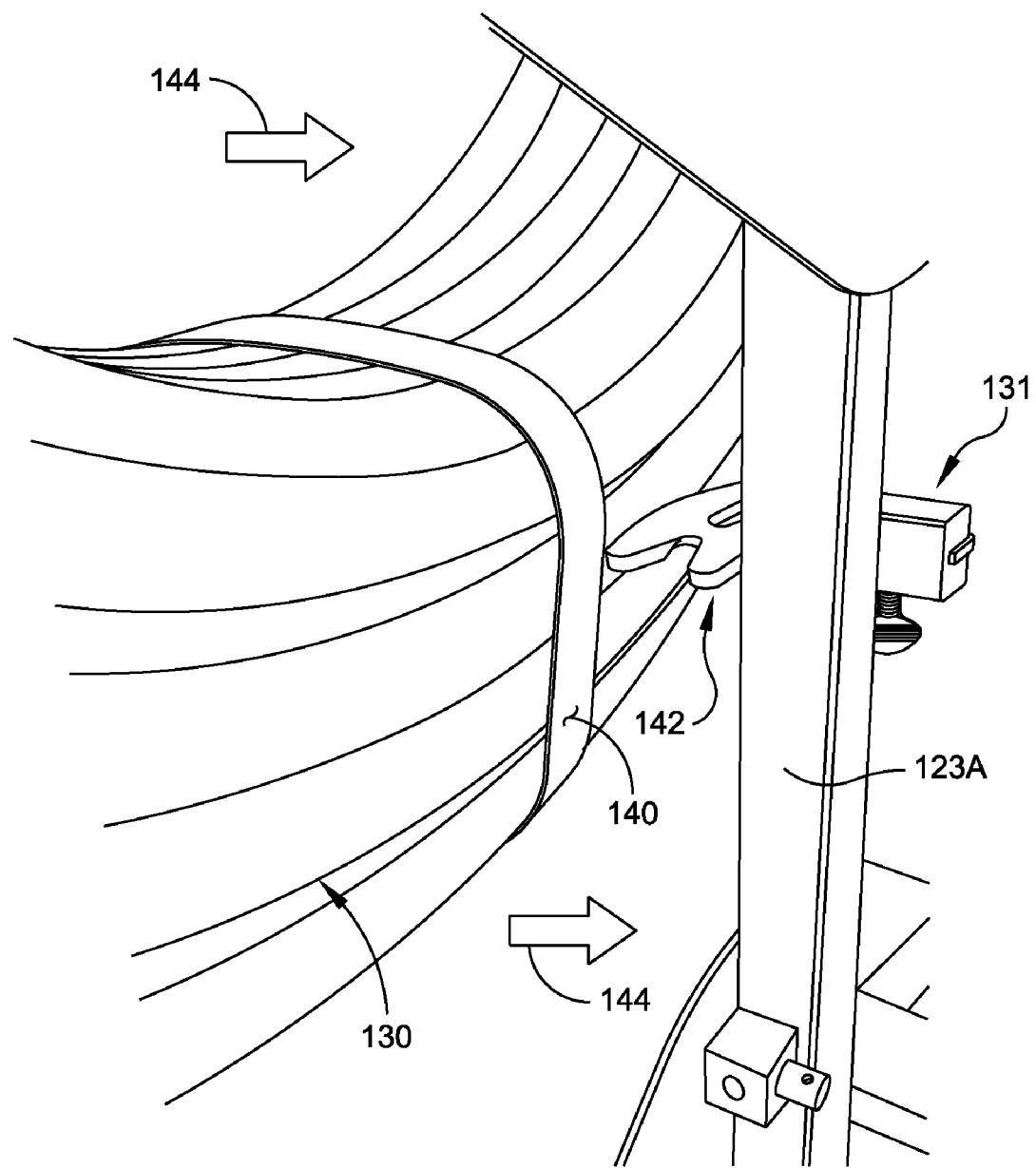
FIGS. 20-22 are a series of fragmentary perspective views illustrating a cutting mechanism used with the apparatus.
Figure 21:
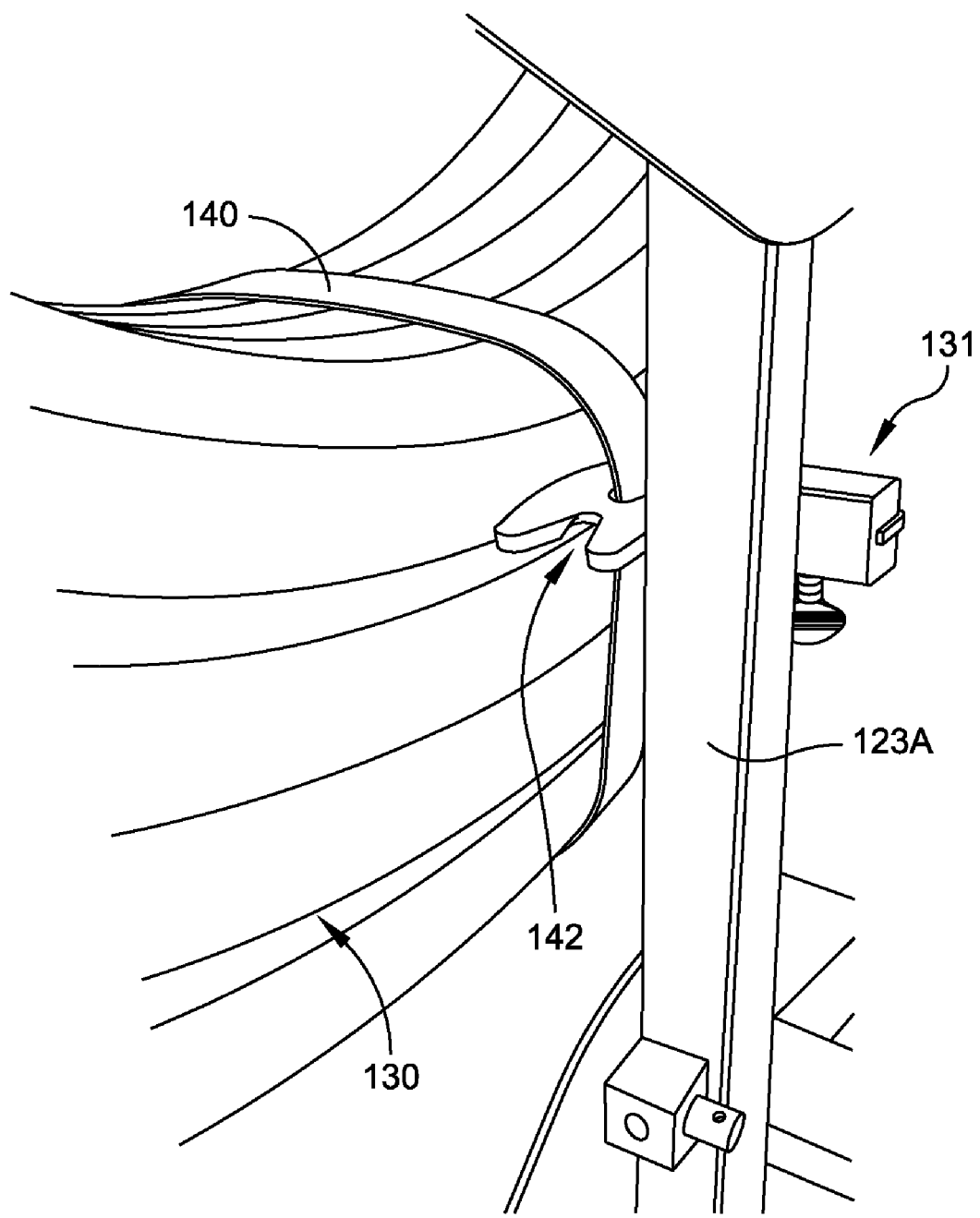
Figure 22:
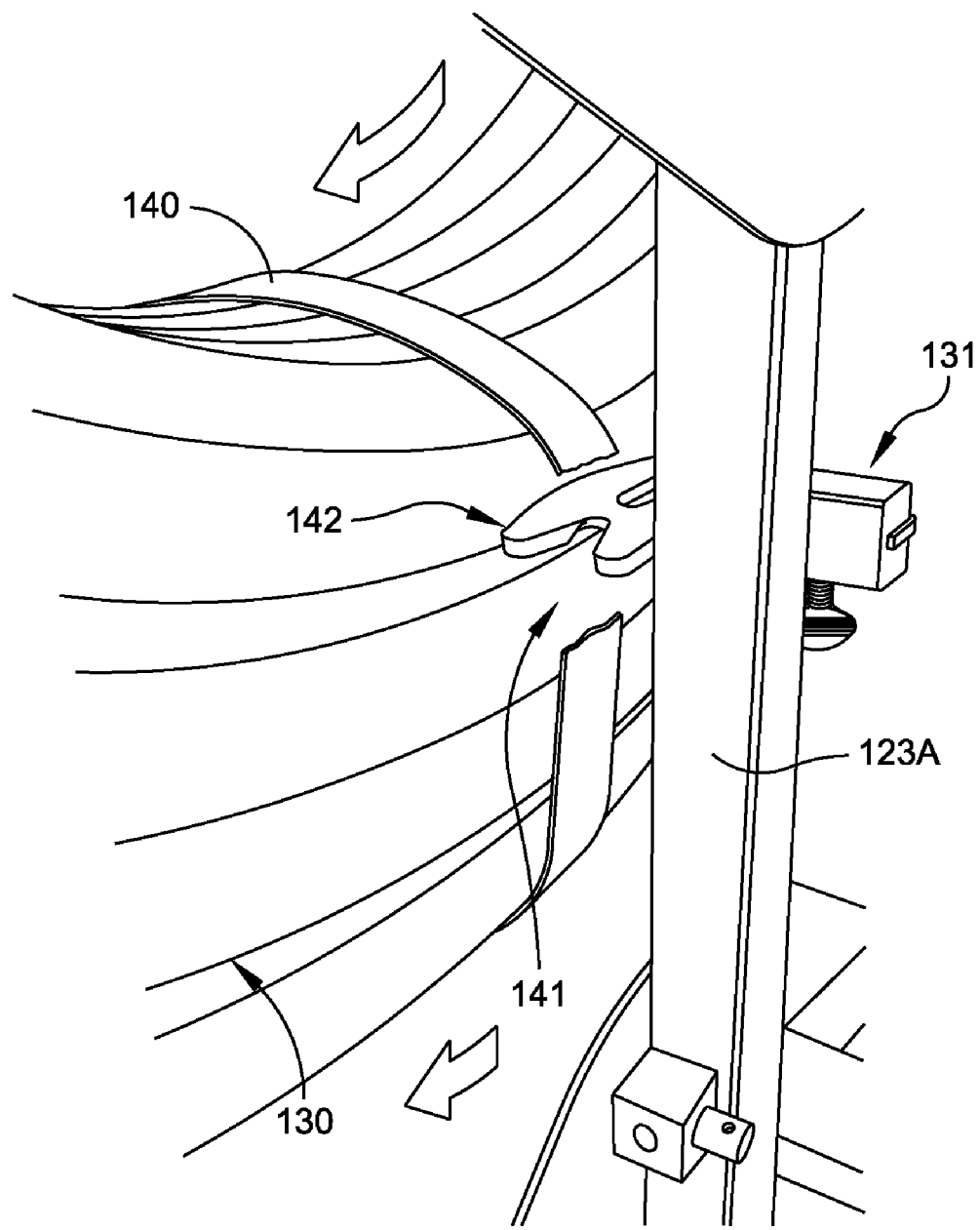

Reference is now made to FIGS. 20-22 for a further illustration of the cutting mechanism 131 previously mentioned in connection with FIGS. 18 and 19. This mechanism is mounted in a manner so that the blade thereof can be used to cut through a tape 140. This cutting operation is essentially automatic in that the tape will be cut by engagement with the cutting mechanism as the roll of tubular material is unwound (dispensed). FIGS. 20-22 are a series of fragmentary perspective views illustrating the cutting mechanism used with the apparatus. In each of these views the cutting mechanism 131 is shown attached to the rail 123A and includes a blade 142 that is arranged to be essentially orthogonal to the tape length so that as the roll is dispensed the blade 142 cuts through the tape 140. FIG. 20 shows an initial position in which the roll is still located spaced from the rail 123A and about to move in the direction of arrows 144. This movement can be by adjustment of the end sections relative to each other. FIG. 21 shows the blade 142 about to pierce the tape 140, while FIG. 22 illustrates the final step of cutting the tape at 141. The blade 142 can actually extend in between individual winds of the roll so that the blade of the cutting mechanism can effectively cut through the tape. In this regard see also FIG. 10 wherein the roll is relatively tight against the upright rollers R, while in FIG. 23 the roll is positioned more outwardly so as to properly make contact between the tape on the roll and the cutting mechanism blade.

As illustrated in FIGS. 18 and 19 the cutting mechanism 131 includes the aforementioned blade 142. The blade is shown as having opposite end blade segments 142A and 142B, as well as support arm 146. The blade has opposite blade segments so that a cutting operation can be accomplished in either direction of unwinding of the pipe roll. The blade 142 is supported at the arm 146 between mounting blocks 147, 148. One or more of these blocks are secured to the rail 123A. A securing screw 149 is used to secure the blade 142 to the blocks 147, 148.

Figure 25:
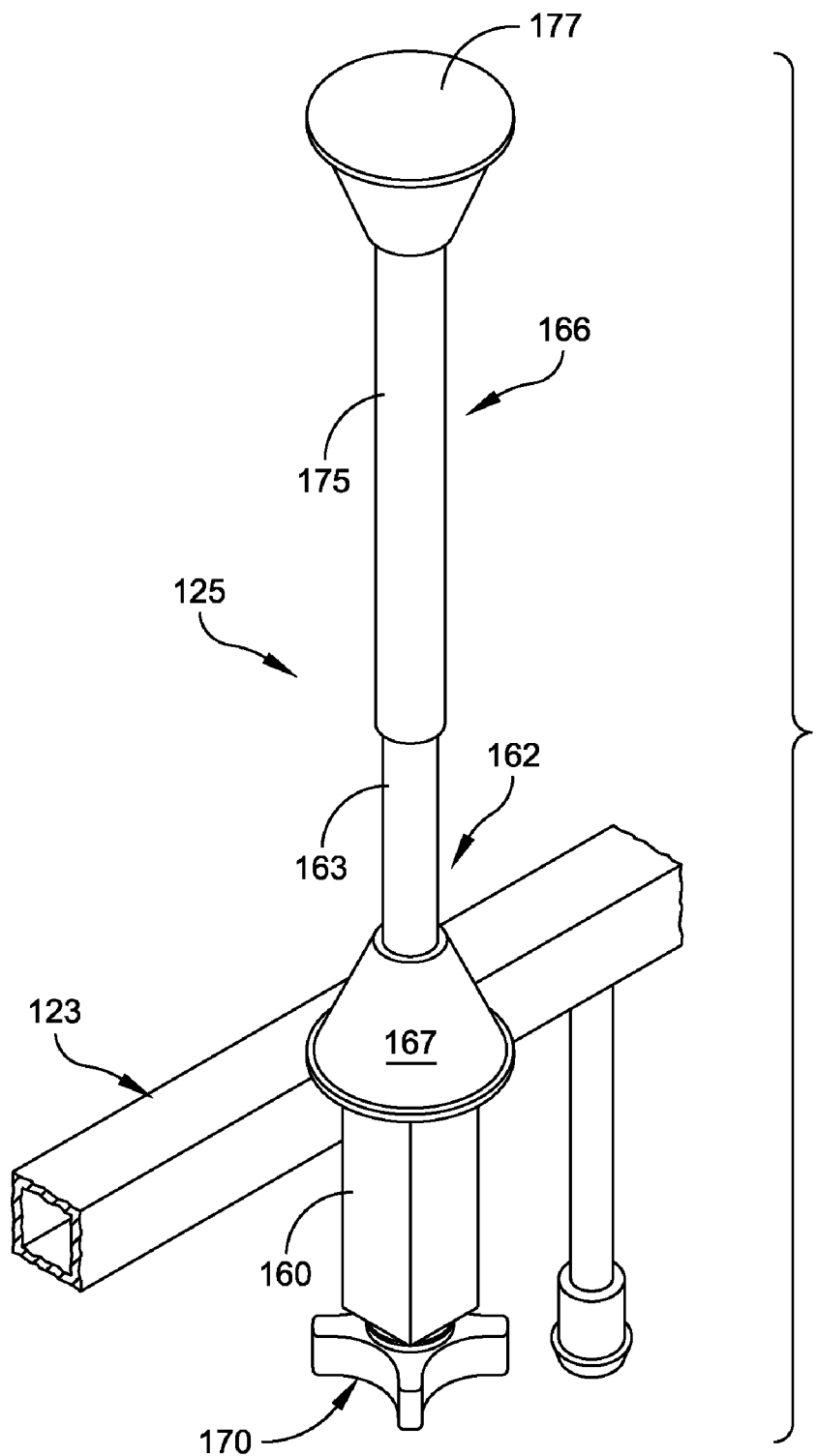
FIG. 25 is a partial perspective view of the spool support used in the second embodiment that is described herein in FIGS. 14-19.
Figure 26:
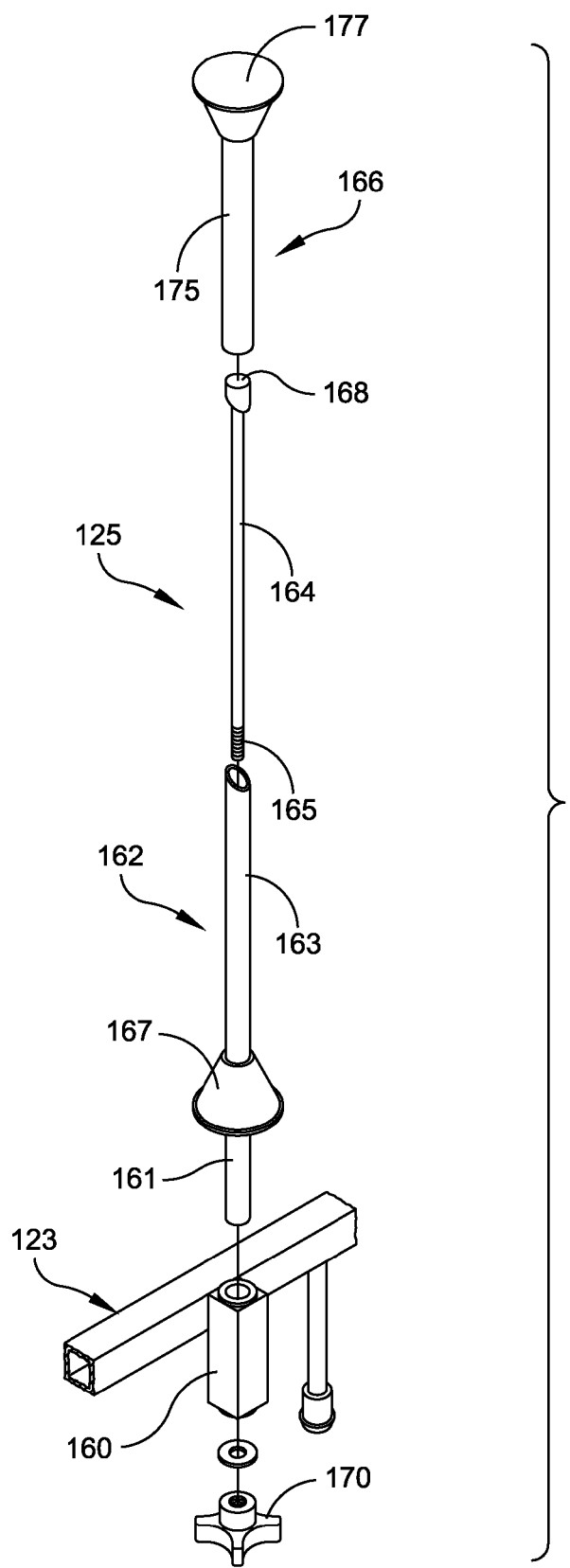
FIG. 26 is an exploded perspective view of the spool support of FIG. 25.
Figure 27:
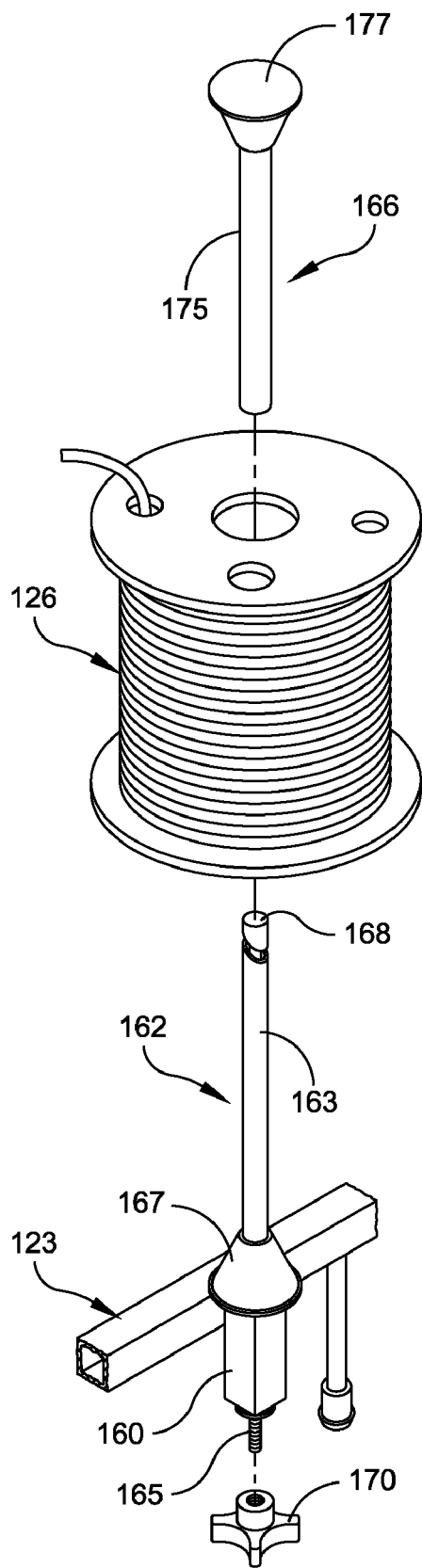
FIG. 27 is an exploded perspective view like that shown in FIG. 26 and further including the spool itself.
Figure 28:
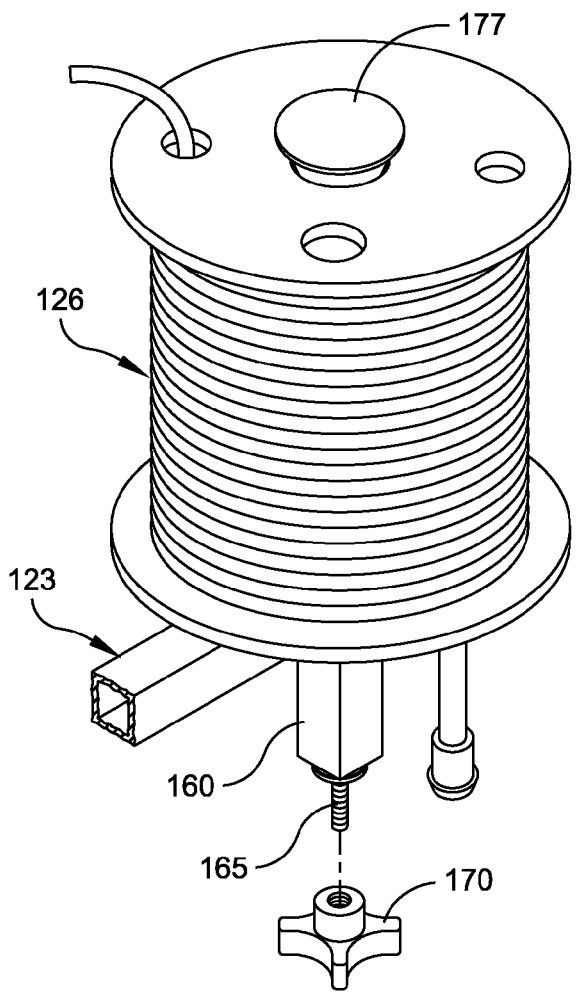
FIG. 28 is a fragmentary perspective view at the spool area.
Figure 29:
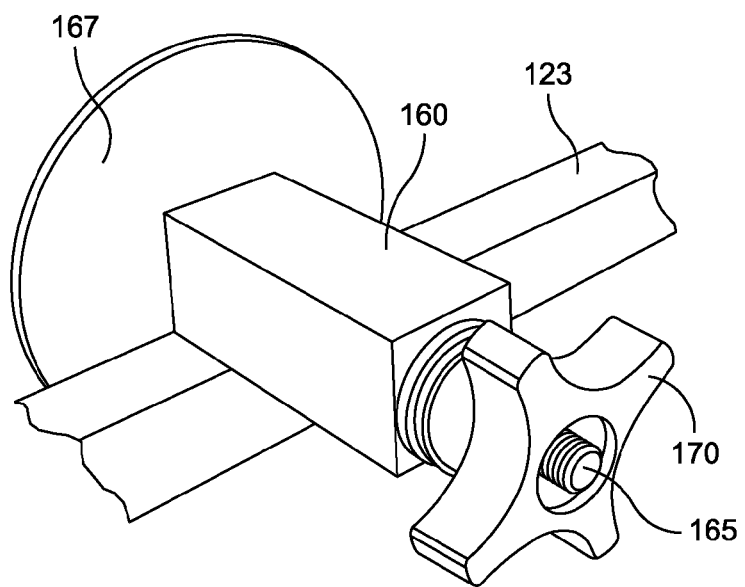
FIG. 29 is a fragmentary perspective view at the base of the spool support.

In the embodiment of the present invention illustrated in FIGS. 14-24 the spool support employs a simple way to support and interchange spools. As described previously, there is shown in, for example, FIG. 14 the spool support member 125 that is attached to the center strut 123. FIG. 25 is a partial perspective view of the spool support used in the second embodiment that is described herein in FIGS. 14-19. FIG. 26 is an exploded perspective view of the spool support of FIG. 25 while FIG. 27 is an exploded perspective view like that shown in FIG. 26 and further including the spool itself. FIG. 28 is a fragmentary perspective view at the spool area while FIG. 29 is a fragmentary perspective view at the base of the spool support. FIGS. 30-35 show still further details.

The member 125 is in the form of an assembly that is comprised of a base 160, lower spool support 162, attachment rod 164 and upper spool support 166. The base 160 is secured to the strut 123 such as by being welded thereto. Refer to FIG. 29 that shows from the bottom the base 160 attached to the strut 123. The base 160 has a central passage disposed therethrough for receiving part of the lower spool support 162, as well as the attachment rod 164. FIGS. 27 and 28 show the lower threaded end 165 of the attachment rod 164. A female knob 170 is internally threaded for engagement with the threaded end 165 of the attachment rod 164. The attachment rod 164 also has a top head 168.

The lower spool support 162 includes separate integrally formed sections including lower section 161, upper section 163 and intermediate cone 167. A central passage is also proved through the lower spool support 162 for accommodating the attachment rod 164. The attachment rod 164 extends through the center passage in the lower spool support 162, as well as through the base 160 so that the threaded end of the attachment rod extends below the base 160. The lower end of the rod 164 is supported in a pair of bearings 169 in the base 160. The knob 170 can then thread onto the threaded end 165 of the attachment rod 164 where the threaded end extends below the set of bearings 169. Refer to the cross-sectional views of FIGS. 30 and 35 which illustrate the rod 164 rotatable within the base 160.

Figure 35:
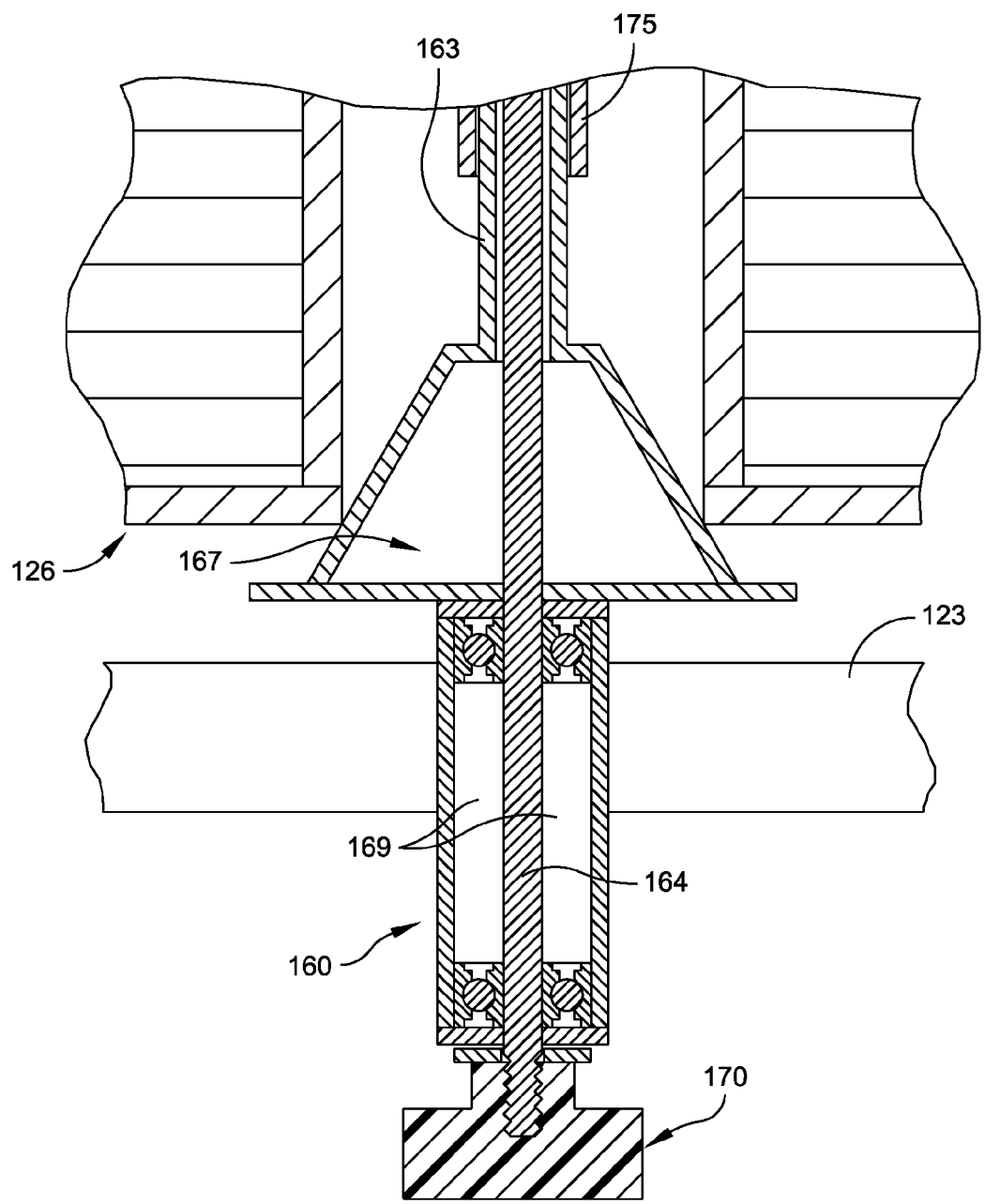
FIG. 35 is a fragmentary cross-sectional view of the support structure of the spool showing further details.

Now, reference is also made to FIGS. 31-35 for a further understanding of the manner in which the securing knob 170 is rotated so as to tighten the knob and also tighten the attachment rod 164 against both the upper spool support 166 and the lower spool support 162. Thus, when the spool supports and the attachment rod 164 are secured in place, such as shown in FIG. 35, the cone sections 167 and 177 are able to freely rotate with the attachment rod 164, and, in turn, the spool is free to rotate on the attachment rod.

Figure 32:
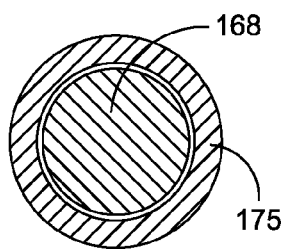
FIG. 32 is a cross-sectional view taken along line 32-32 of FIG. 1.
Figure 34:
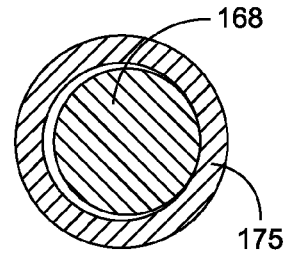
FIG. 34 is a cross-sectional view taken along line 34-34 of FIG. 33.
Figure 31:
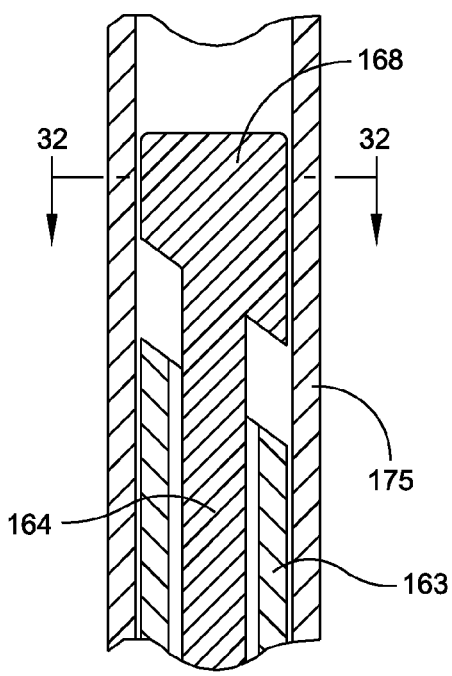
FIG. 31 is a fragmentary cross-sectional view of a portion of the support structure at the head of the attachment rod.
Figure 33:
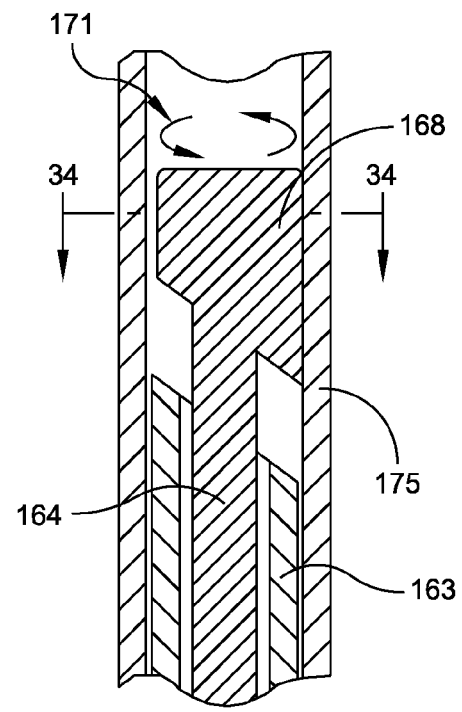
FIG. 33 is a fragmentary cross-sectional view like that shown in FIG. 31 but with the attachment rod tightened.

Refer to FIGS. 31 and 32 for a condition in which the knob 170 has not yet been tightened. In that position it is noted that the head 168 is disposed at about a midpoint within the section 175. In other words the head has about the same small spacing on either side thereof relative to the passage in the section 175. In that position the spool supports 162 and 166 are not yet locked with the attachment rod 164. Now, FIGS. 33 and 34 then illustrate the attachment rod 164 rotated (see arrows 171 in FIG. 33) to a point where the head 168 is urged against the inner sidewall of the section 175 to essentially lock the attachment rod and section 175 together so that the spool then is rotatable with the attachment rod. The head 168 of the attachment rod 164 may also be mated with a top end of the upper section 163 of the lower spool support 162. This mating may be by means of cooperating surfaces such as the illustrated tapered surfaces. The very bottom of the spool at its opening rests upon the cone section 167 providing an even support surface for the spool 126. The sections 163 and 175 may be able to rotate relative to each other but are preferably interlocked so that when the attachment rod rotates both of the conical sections also rotate therewith.

The upper spool support 166 includes a tubular section 175 and a top cone section 177 that is integral with the tubular section 175. The tubular section 175 has a central passage with an inner diameter that is larger than the outer diameter of the lower spool support section 163. In this way the upper spool support 166 can be positioned over the lower spool support 162. The cone section 177 is thus in engagement with the top opening in the spool. In FIG. 25, even though no spool is shown, the tubular section 175 is illustrated as extending over the top part of the lower spool support section 163. To replace a spool the knob 170 is unscrewed and thus the lock between the attachment rod and section 175 is released. This enables the user to lift the spool off the support. When the spool is lifted the upper spool support 166 can be lifted therewith. The new spool is then lifted into position over the lower support structure 162 and the upper spool support 166 is next disposed onto the spool and into engagement with the lowers spool support 162. The cone section 177 engages and holds the top end of the spool at the top opening thereof. The knob 170 can then be tightened.

Figure 30:
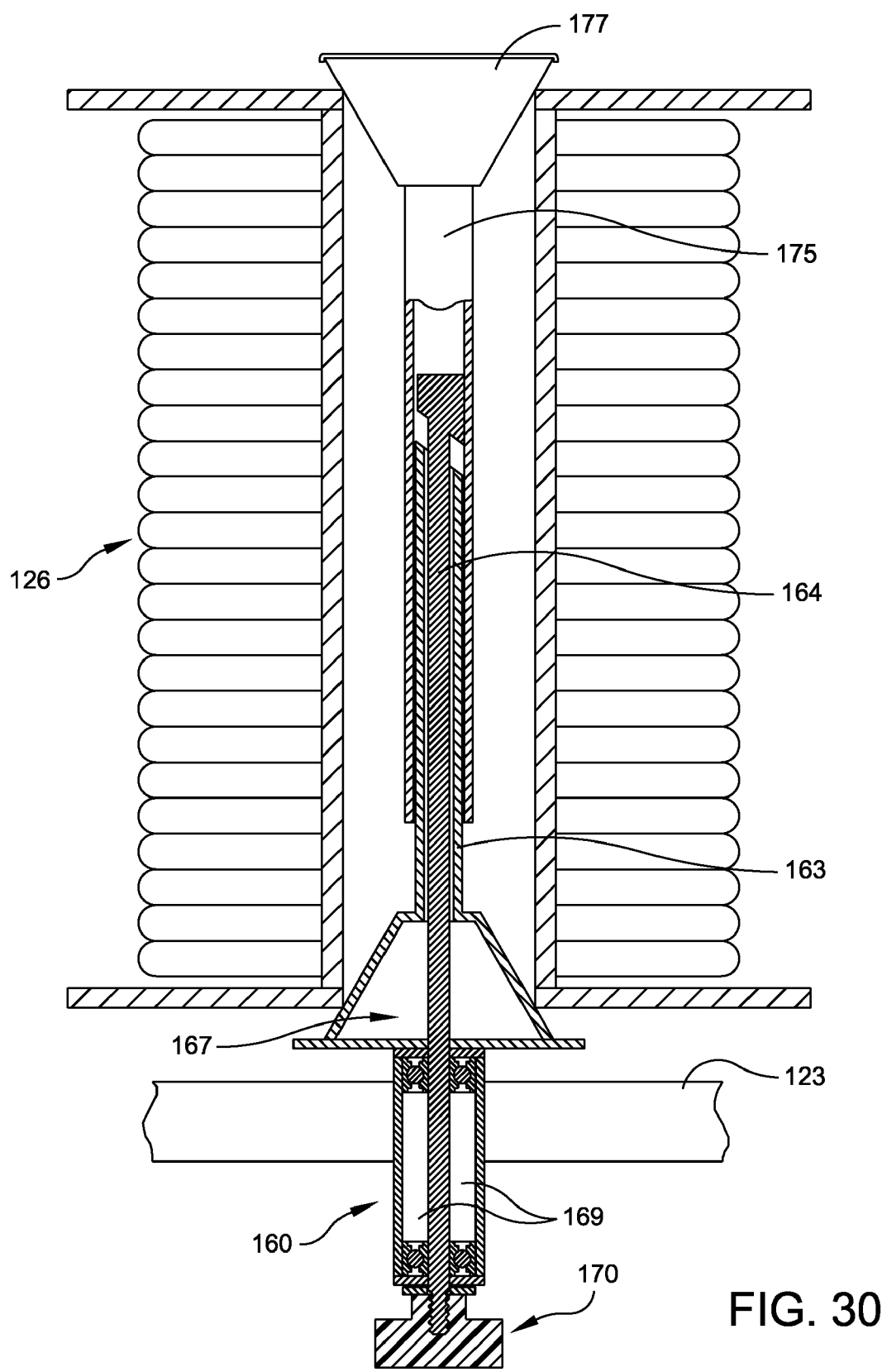
FIG. 30 is a cross-sectional view of the spool and its associated support structure.
Figure 36:
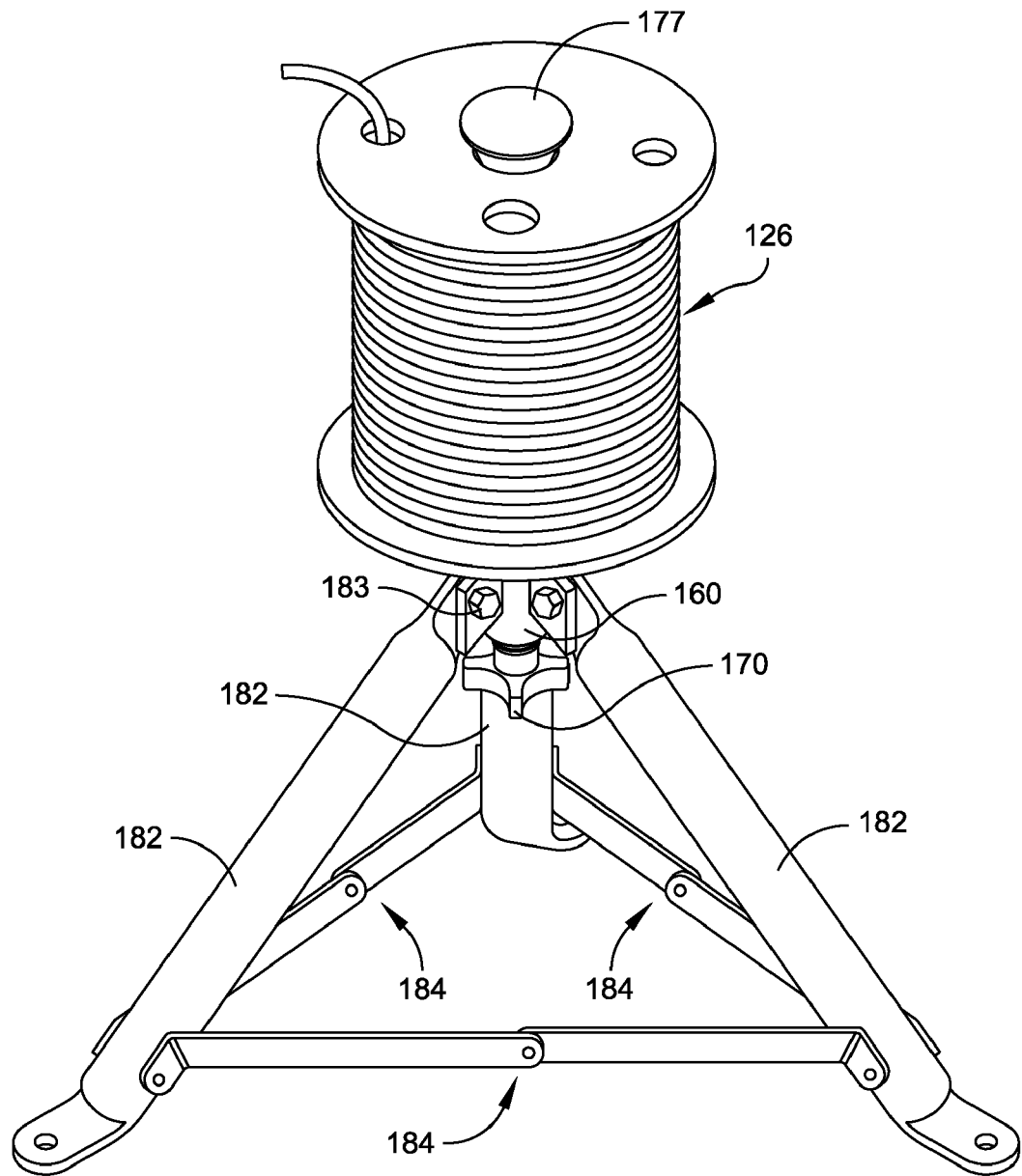
FIG. 36 is a perspective view of the spool support as embodied in a separate structure that is free standing including a support tripod.
Figure 37:
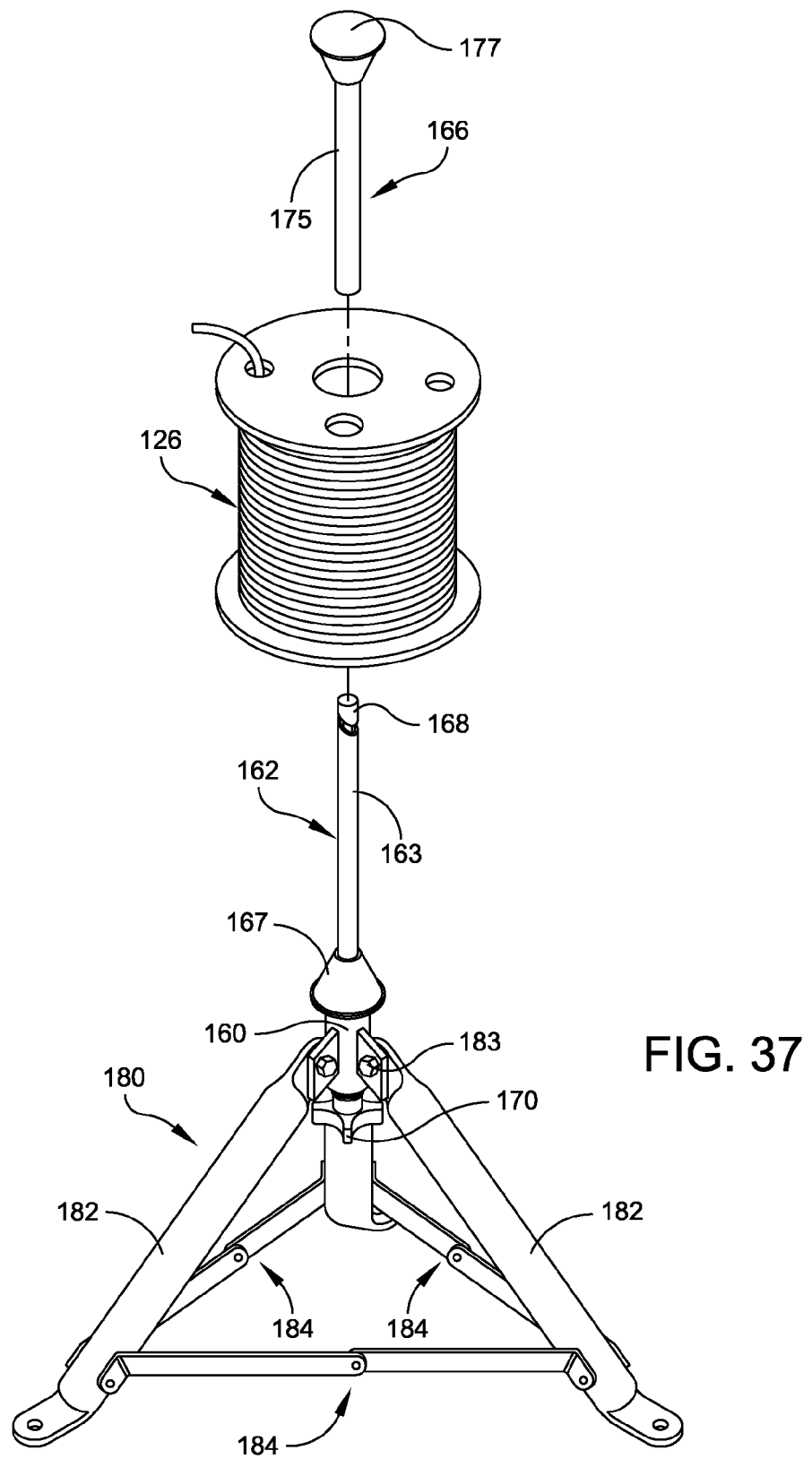
FIG. 37 is an exploded perspective view of the structure of FIG. 30.

In the embodiment shown in FIGS. 25-29 the spool structure is explained as being attached to the pipe support and dispensing apparatus of the present invention. However, this particular spool support structure can also be used in a free standing manner, as is illustrated in FIGS. 36 and 37. In FIGS. 36 and 37 the same reference numbers are used as previously described in connection with the previous description of the second embodiment of the pipe support and dispensing apparatus. Thus, there is described an assembly that is comprised of a base 160, lower spool support 162 (FIG. 31), attachment rod 164 (only the head of which is shown in FIG. 31) and upper spool support 166. The base 160, instead of being secured to a strut, is instead supported from a foldable tripod 180. The base 160 has a central passage disposed therethrough for receiving the lower threaded end of the attachment rod 164. FIGS. 30 and 35 show the lower threaded end 165 of the attachment rod 164. A female knob 170 is internally threaded for engagement with the threaded end 165 of the attachment rod 164. The attachment rod 164 also has a top head 168.

The tripod 180 may be considered as of conventional type including a set of legs 182 that are interconnected by foldable legs 184. The top of each leg 182 includes a pivot joint 183 that enables the legs to be moved between folded and unfolded positions. FIGS. 36 and 37 show the tripod in its unfolded state and in readiness for use for support of the spool 126. The legs can be moved to a more folded position by pivoting the arms 184 at a central joint thereof to move the legs into a more parallel relative position. The pivots at the top end of each leg are each attached to the base 160 providing a firm support for the spool when the legs are in their unfolded position. When the knob 170 is tightened this urges the head against the section 175. This is the same structure and operation as previously described in connection with the description of FIGS. 25-35.

The tubular section 175 has a central passage with an inner diameter that is larger than the outer diameter of the lower spool support section 163. In this way the upper spool support 166 can be positioned over the lower spool support 162. The cone section 177 is in engagement with the top opening in the spool. In FIG. 25, even though no spool is shown, the tubular section 175 is illustrated as extending over the top part of the lower spool support section 163. To replace a spool the knob 170 is unscrewed and thus the lock between the attachment rod and section 175 is released. This enables the user to lift the spool off the support. When the spool is lifted the upper spool support 166 can be lifted therewith. The new spool is then lifted into position over the lower support structure 162 and the upper spool support 166 is next disposed onto the spool and into engagement with the lowers spool support 162. The cone section 177 engages and holds the top end of the spool at the top opening thereof. The knob 170 can then be tightened.

Figure 38:
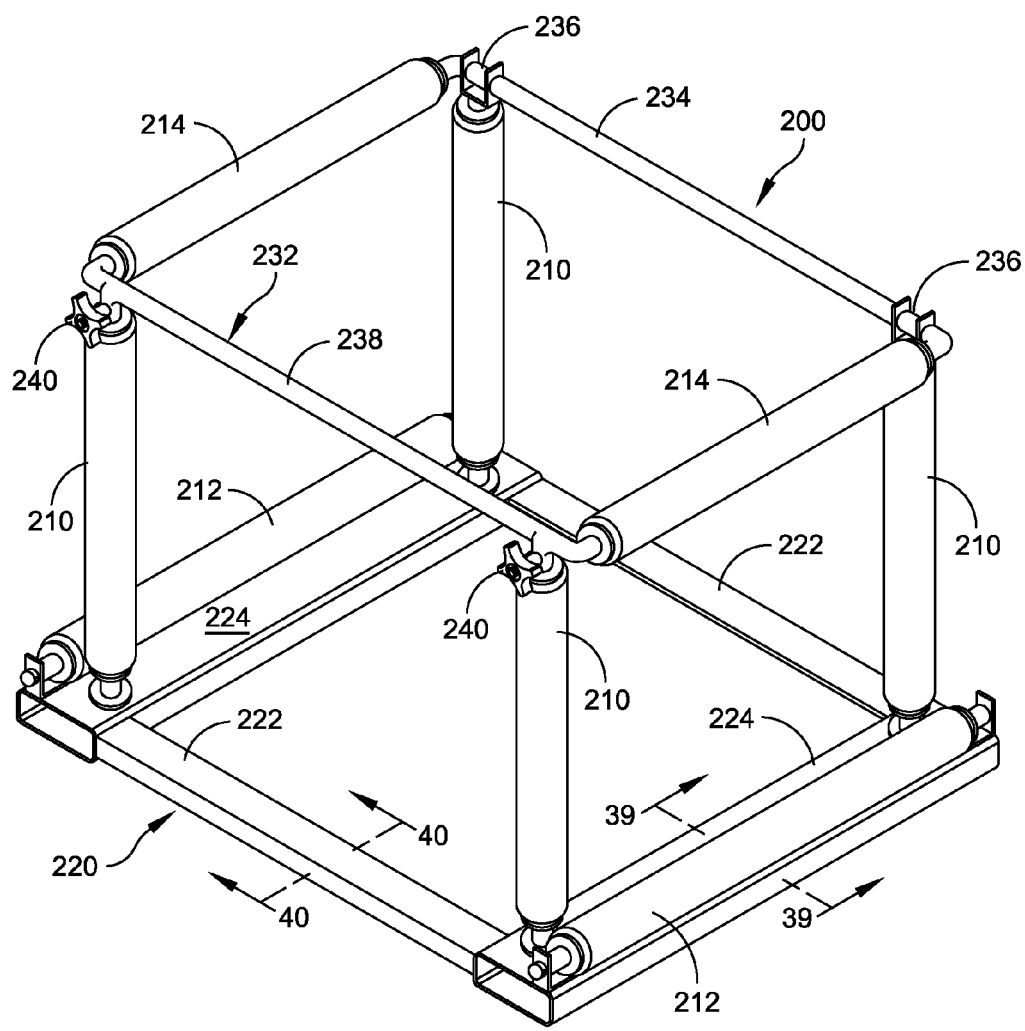
FIG. 38 is a perspective view of an alternate embodiment of a support structure for a pipe roll.
Figure 39:
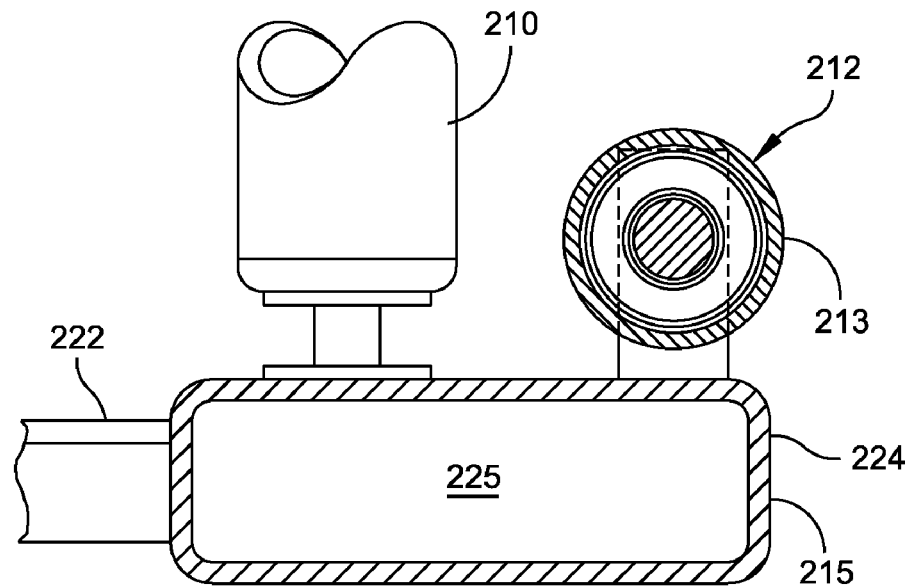
FIG. 39 is a cross-sectional view taken along line 39-39 of FIG. 38.
Figure 40:
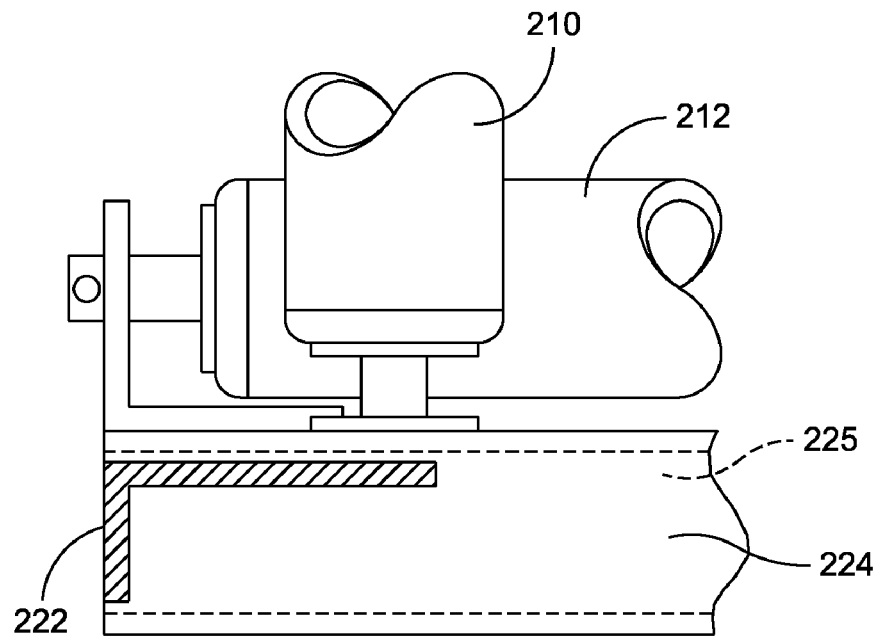
FIG. 40 is a cross-sectional view taken along line 40-40 of FIG. 38.
Figure 41:
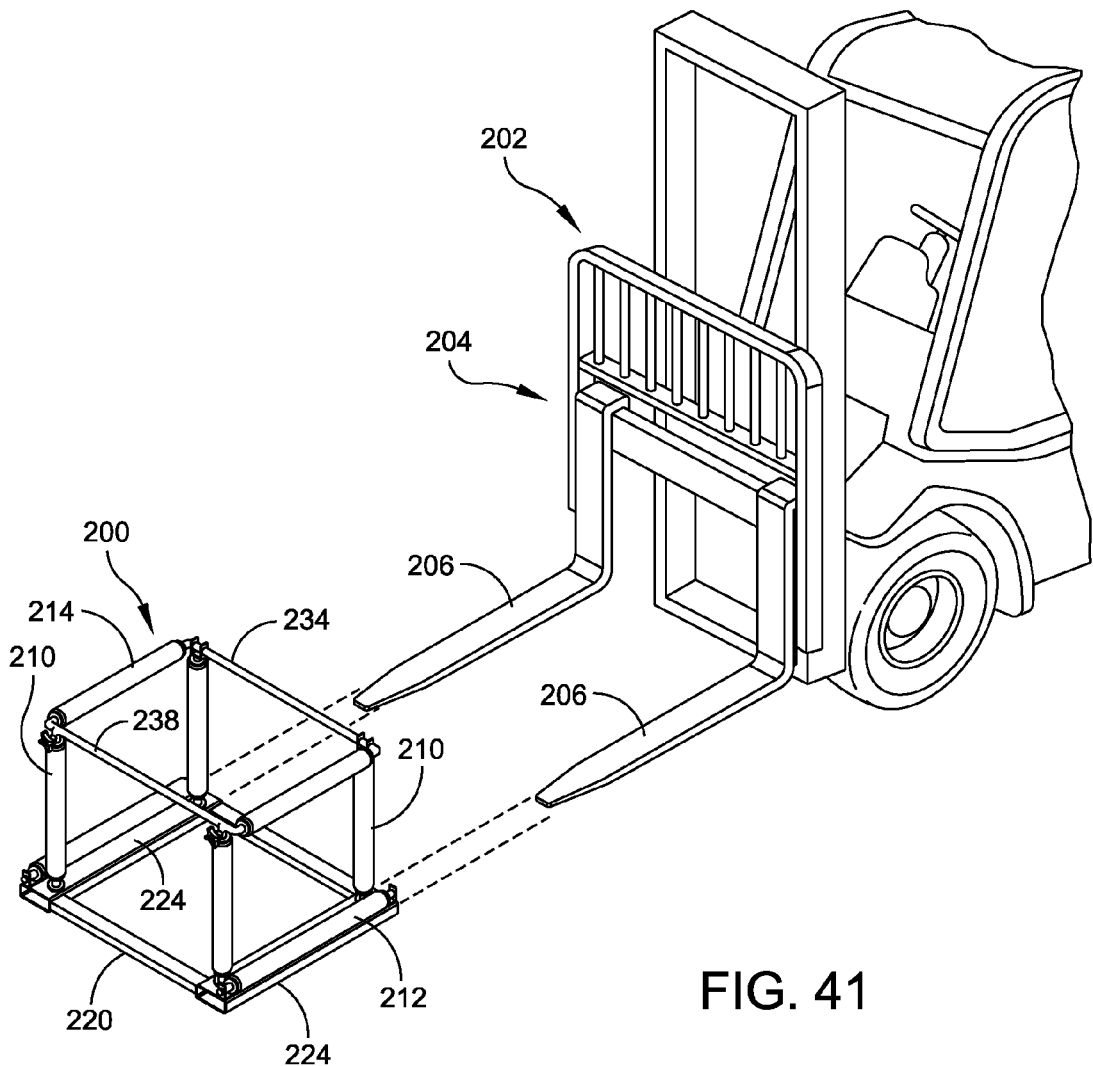
FIG. 41 is an illustrated perspective view showing the manner in which the apparatus is lifted by a forklift.
Figure 42:
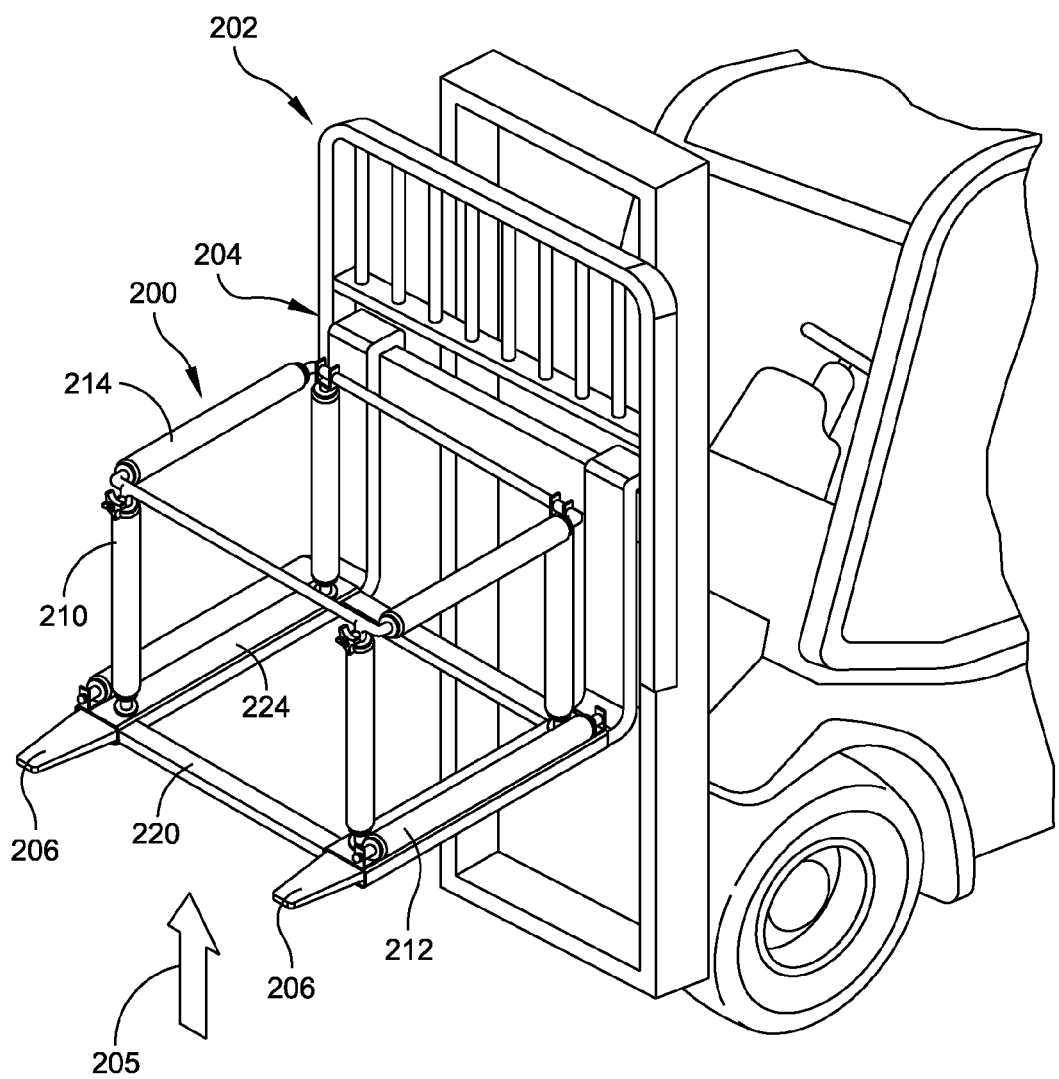
FIG. 42 is a perspective view showing the forklift apparatus lifting the support apparatus of the present invention.
Figure 43:
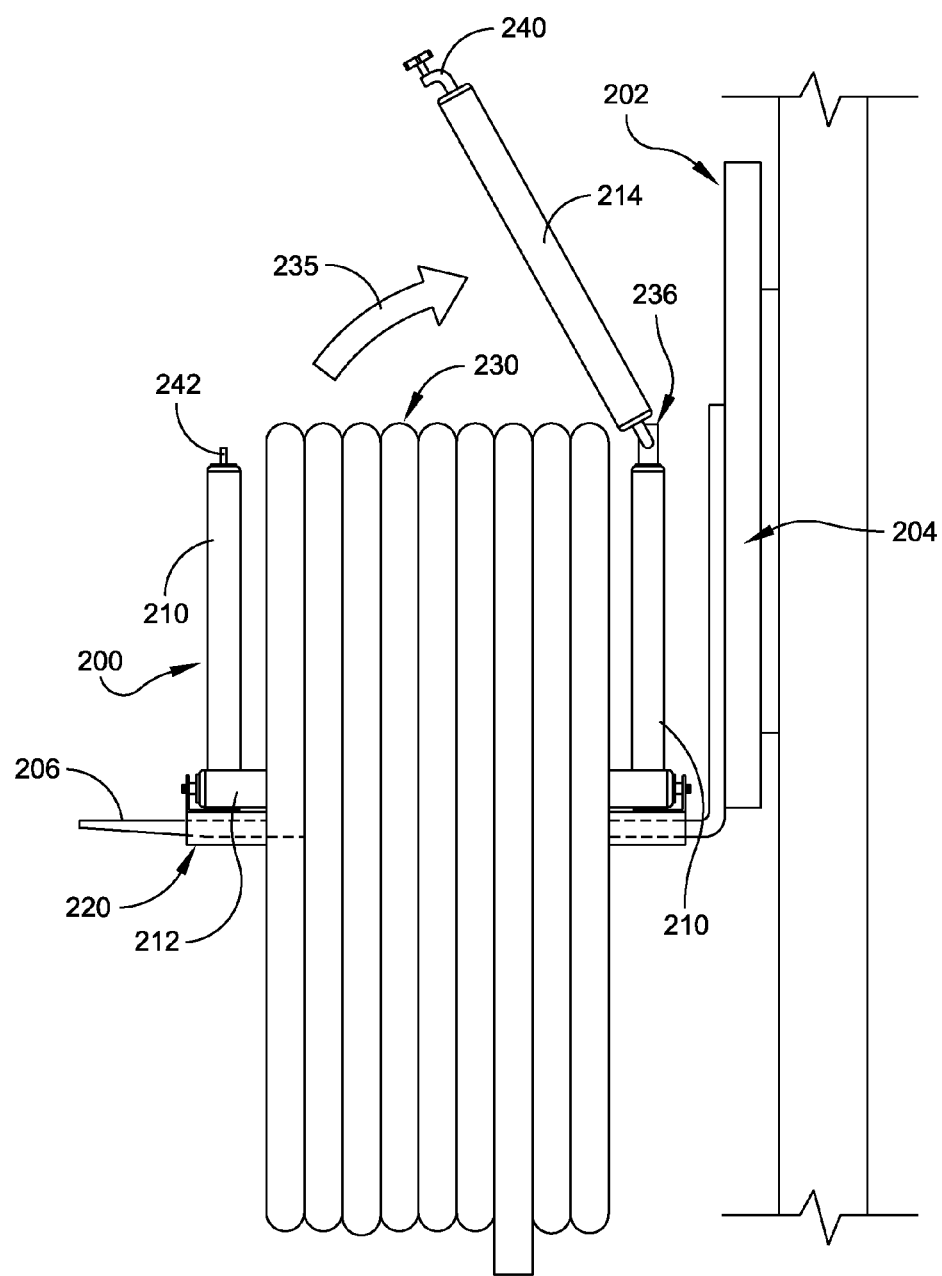
FIGS. 43 and 44 schematically illustrate how the pipe roll is supported.
Figure 44:
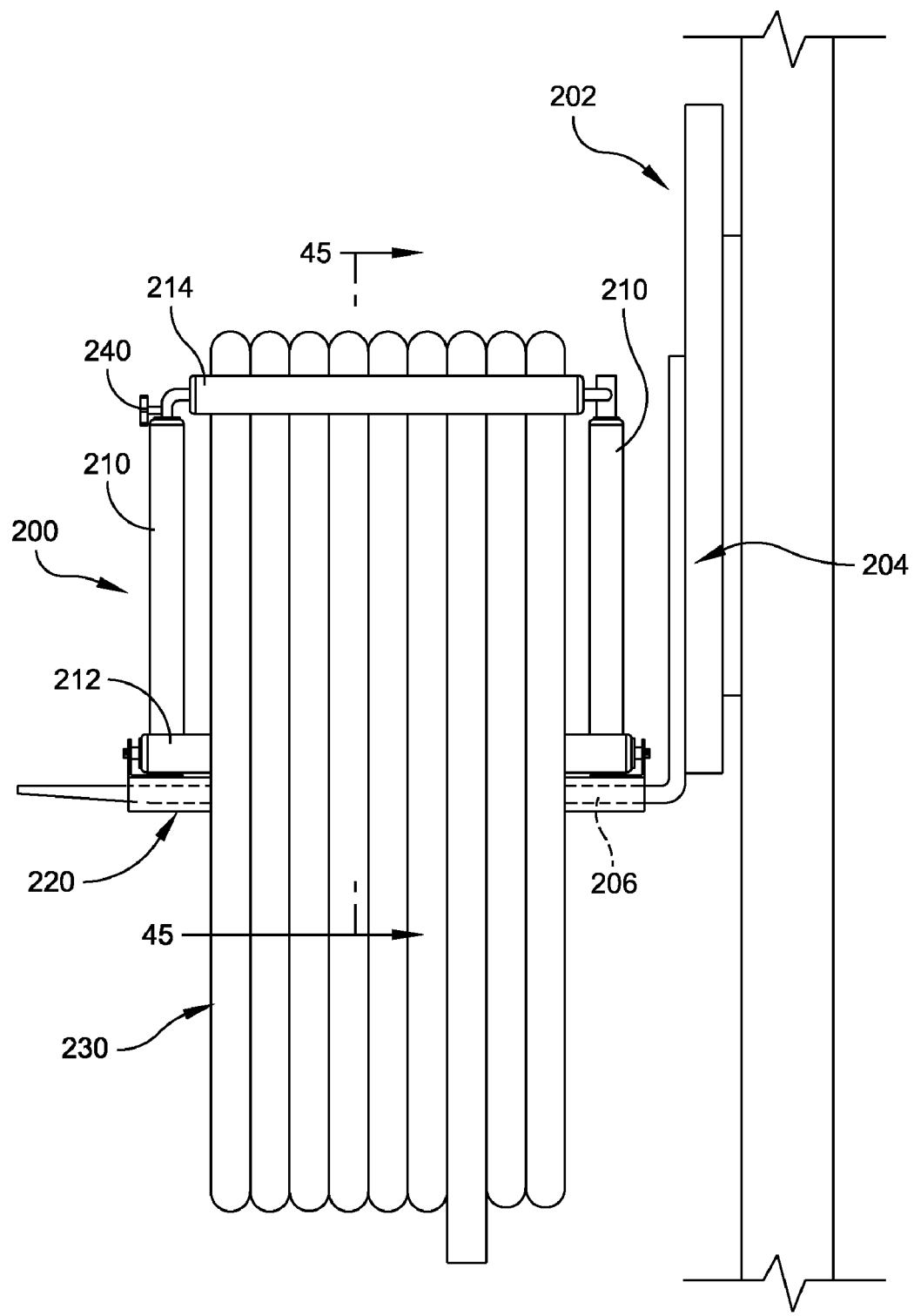

Reference is now made to a further embodiment of the present invention illustrated in FIGS. 38-45. FIG. 38 is a perspective view of an alternate embodiment of a support structure for a pipe roll. FIG. 39 is a cross-sectional view taken along line 39-39 of FIG. 38. FIG. 40 is a cross-sectional view taken along line 40-40 of FIG. 38. FIG. 41 is an illustrated perspective view showing the manner in which the apparatus is lifted by a forklift. FIG. 42 is a perspective view showing the forklift apparatus lifting the support apparatus of the present invention. FIGS. 43 and 44 schematically illustrate how the pipe roll is supported.

FIG. 38 is a perspective view of this embodiment of the invention in the form of a roll supporting and dispensing apparatus 200 that is particularly adapted for handling by a conventional forklift device. In this regard refer to FIGS. 41 and 42 that show the conventional forklift equipment at 202. This forklift equipment typically includes a carriage 204 for supporting a pair of outwardly extending forks 206. This description does not go into any substantial detail regarding the forklift equipment as this equipment is well known to one skilled in the art. The manner in which the forklift device engages the apparatus 200 is discussed hereinafter in further detail after an explanation of the apparatus depicted primarily in FIG. 38.

The apparatus disclosed in FIG. 38 is comprised of a series of rollers at least some of which may be rotatable on their longitudinal axis. Certain of these rollers may also not be required to be rotatable on their longitudinal axis. The roller construction illustrated in FIG. 38 includes four upright rollers 210, a pair of base rollers 212 and a pair of upper pivotal rollers 214.

All of the aforementioned rollers are supported from a base frame 220 which extends in a substantially rectangular manner including front and rear pieces 222 and side pieces 224. The pieces 222 and 224 may all be constructed of a metal material and are joined together in some well known manner such as by welding or with the use of other securing fasteners. Reference can also be made to FIGS. 39 and 40 that shows the cross-sections of these pieces. For example, the side pieces 224 are constructed with a closed shape so as to provide an opening 225 configured and dimensioned so as to receive the forks 206 such as in the positions illustrated in FIGS. 41 and 32. This provides an effective way of being able to have the fork lift equipment engage, raise and lower the position of the apparatus 200. FIG. 40 also illustrates the cross-section of the front and rear pieces 222. This is shown as having an L-shaped cross-section. However, other configurations of these members may also be employed.

The rectangular-shaped frame 220 is for the support of the upright set of rollers 210. For the particular support of the rollers reference may be made to previous cross-sectional views such as shown in FIGS. 7-9 herein. In those particular embodiments, each of the rollers is supported on a main shaft S by means of bearings B. In an alternate embodiment, for the rollers 210, they may be supported so that they are nonrotatable. The bottom end of each roller 210 is supported at the side pieces 224. There are four rollers 210 and thus one pair of the rollers 210 is supported at opposite ends of one of the side pieces 224 and the other two rollers 210 are supported at opposite ends of the other side piece 224. Appropriate securing means may be used for securing the rollers in place. This may include some type of a bolt or other fastener.

Figure 45:
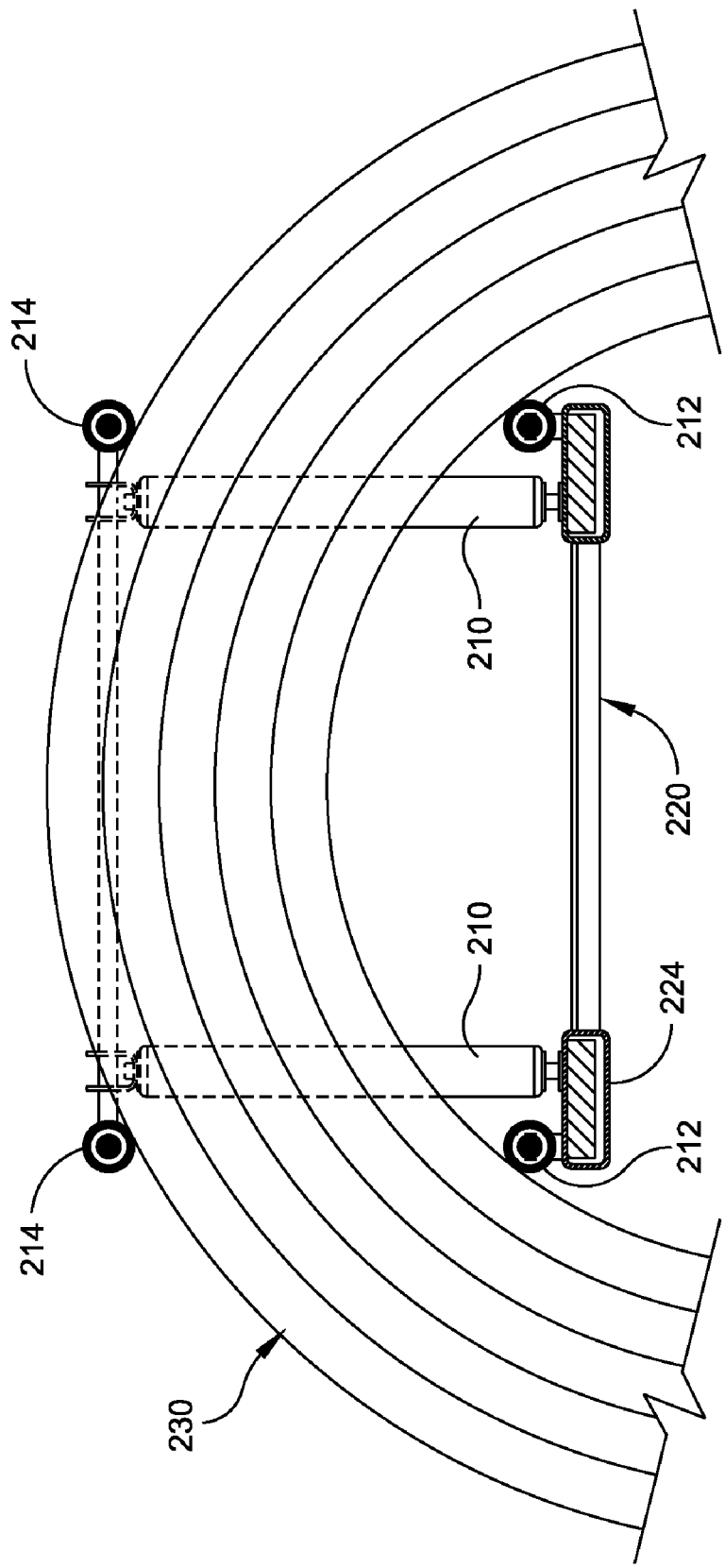
FIG. 45 is a view transverse to the views of FIGS. 43 and 44 to show the primary support point on the apparatus for the roll of pipe material.

Also supported from the side pieces 224 are respective rollers 212. In this regard refer to the cross-sectional view of FIG. 39 that shows the rollers 212. The outer edge 213 of the roller 212 is preferably disposed so as to be slightly outboard of the outer edge 215 of the side piece 224. In that way, when the roll of material 230 is supported, as illustrated in FIGS. 43 and 44, the substantially only contact points on the inner surface of the roll 230 is at the spaced apart rolls 212. In this regard, refer to FIG. 45 that shows the manner in which the supported roll of pipe material is supported primarily only from the spaced apart rollers 212 when the apparatus assumes a position such as shown in FIGS. 43 and 44. FIG. 45 also shows that the upper side of the roll 230, depending on the size of the roll 230, may be guided by the top rollers 214.

FIG. 38, along with FIG. 39, shows the manner in which both of the rolls 212 are supported slightly outboard of their associated support pieces 224. The rollers 212 are preferably supported so that they are rotatable relative to a center shaft as previously illustrated in FIGS. 7-9 herein. Once again, the view of FIG. 45 shows the primary support for the roll 230 of pipe material.

Reference is now made to FIGS. 41 and 42. These figures illustrate the manner in which the forklift equipment is engaged with the apparatus 200. In the perspective view of FIG. 41, the two forks 206 are shown disengaged from the apparatus 200 but in line with the corresponding side pieces 224. FIG. 42 then illustrates the position wherein the forks 206 have engaged in the slots 225 of the side pieces 224. Moreover, in FIG. 42 the carriage 204 of the forklift has been lifted. This is indicated by the arrow 205 in FIG. 42. This now positions the support apparatus 200 for receipt of a roll of pipe material as depicted in FIGS. 43 and 44.

Once again, in FIG. 38, there is also provided a pair of upper pivotal rollers 214 that are basically supported by a frame 232 so that the rollers 214 can be spaced apart. At one end of the rollers 214 the frame leg 234 is constructed so as to provide opposite pivots at 236. In this regard refer also to FIG. 43 wherein it is shown that the rollers 214 have been pivoted at the pivot or hinge 236 so as to provide access for the roll of pipe material to be supported within the apparatus. FIG. 43 also indicates by arrow 235 the pivotal direction that the rollers 214 move so as to provide an open space into which the roll of pipe material can be positioned.

With further reference to the perspective view of FIG. 38, the opposite ends of the rollers 214 are supported by a further frame leg 238. The legs 234 and 238 along with center shafts for the respective rollers 214 provide a complete frame structure that is readily pivoted between the respective positions such as shown in FIGS. 43 and 44. FIG. 44 illustrates the rollers 214 moved back to there locked position. For locking the rollers 214 in place, there are provided respective tightening knobs 240. For further details of pivot and lock arrangements, reference may be made to the previous cross-sectional views of FIGS. 7-9. The knob 240 in FIG. 38 is analogous to the tightening screw X in FIG. 7. The knob 240 may be tightened against a post 242 illustrated in FIG. 43 at the top of the roller 210. In order to receive the roll 230, the knobs 240 are simply loosened and the entire top assembly including the rollers 214 can then be lifted to the position illustrated in FIG. 43. After the roller material has been placed in position, then the rollers 214 and their supporting frame structure may then be moved downwardly in the opposite direction to the arrow 235 with the knobs 240 then preferably locked in place. In FIGS. 43 and 44, it is noted that the upright rollers 210 provide essentially a barrier on opposite sides of the roll of material.

Having now described a limited number of embodiments of the present invention, it should now be apparent to those skilled in the art that numerous other embodiments and modifications thereof are contemplated as falling within the scope of the present invention as defined by the appended claims. For example, there has been described an apparatus that supports a pipe roll. This typically is a roll of plastic pipe material that can be provided in various sizes and lengths. In addition, the principles of the present invention also apply to other types of rolls of a wide variety of tubular materials or non-tubular materials. Also, with respect to the spool support described herein. It has been explained as for support of a spool of wire. However, the spool support can also be used for the support of any one of any number of different types of coiled material including, but not limited to, wire, cable, tubular material or solid strands of material. Moreover, the term "roller" used herein is not to be necessarily limited to a cylindrical roller that is rotatable relative to a center shaft. Some of the roller arrangements shown herein may be non-rotatable particularly where a part of the roll material is not primarily supported thereby when in use.

What is claimed is:

1. An apparatus for supporting and dispensing a pipe roll, said apparatus comprising:
   a frame that includes opposite one and other frame ends and that is comprised of a pair of elongated spaced apart and side by side disposed frame members each having the one and other ends;
   a first pair of rollers that are spacedly disposed and mounted closer to the one end of respective frame members of the frame;
   a second pair of rollers that are spacedly disposed and mounted closer to the other end of respective frame members of the frame;
   said second pair of rollers being disposed in spaced relationship to said first pair of rollers;
   said first and second pairs of rollers all extending substantially in parallel to each other and defining a circular locus with corresponding support points for the pipe roll;
   and a third pair of rollers disposed orthogonal to and outboard of one of said first and second pairs of rollers.

2. The apparatus of claim 1 including a first cross bar disposed over the frame members and that is inter-connected between the ends of the respective rollers of said first pair of rollers, and a second cross bar also disposed over the frame members and that is inter-connected between the ends of the respective rollers of said second pair of rollers.

3. The apparatus of claim 1 wherein said frame includes opposite end support sections for the respective first and second pairs of rollers, and including adjustment means that enable the opposite end support pieces to be adjustable in length.

4. An apparatus for supporting and dispensing a pipe roll, said apparatus comprising:
   a frame that includes opposite one and other frame ends;
   a first pair of rollers that are spacedly disposed and mounted at the one end of the frame;
   a second pair of rollers that are spacedly disposed and mounted at the other end of the frame;
   said second pair of rollers being disposed in spaced relationship to said first pair of rollers;
   said first and second pairs of rollers all extending substantially in parallel to each other and defining a circular locus with corresponding support points for the pipe roll;
   and a third pair of rollers that are disposed orthogonal to said first pair of rollers and disposed outboard of said first pair of rollers.

5. The apparatus of claim 4 including a fourth pair of rollers that are disposed orthogonal to said second pair of rollers and disposed outboard of said second pair of rollers.

6. An apparatus for supporting and dispensing a pipe roll, said apparatus comprising:
   a frame that includes opposite one and other frame ends;
   a first pair of rollers that are spacedly disposed and mounted at the one end of the frame;
   a second pair of rollers that are spacedly disposed and mounted at the other end of the frame;
   said second pair of rollers being disposed in spaced relationship to said first pair of rollers;
   said first and second pairs of rollers all extending substantially in parallel to each other and defining a circular locus with corresponding support points for the pipe roll;
   wherein said frame includes a pair of elongated support pieces that extend from the one end to the other of the frame, and including adjustment means that enable the pair of elongated support pieces to be adjustable in length;
   and means for supporting a wire spool between the pair of elongated support pieces.

7. An apparatus for supporting and dispensing a pipe roll, said apparatus comprising:
   a frame that includes opposite one and other frame ends;
   a first pair of rollers that are spacedly disposed and mounted at the one end of the frame;
   a second pair of rollers that are spacedly disposed and mounted at the other end of the frame;
   said second pair of rollers being disposed in spaced relationship to said first pair of rollers;
   said first and second pairs of rollers all extending substantially in parallel to each other and defining a circular locus with corresponding support points for the pipe roll;
   wherein said frame also includes a base having the pipe roll resting thereover and further including a third pair of rollers that are disposed orthogonal to said first pair of rollers supported from the frame base and a fourth pair of rollers that are disposed orthogonal to said second pair of rollers supported from the frame base.

8. The apparatus of claim 7 wherein all of said third and fourth pairs of rollers are disposed in a single plane.

9. The apparatus of claim 8 including at least one fifth roller spaced outwardly from and in parallel to said first pair of rollers.

10. The apparatus of claim 9 including at least one sixth roller spaced outwardly from and in parallel to said second pair of rollers.

11. The apparatus of claim 10 including a seventh roller releasable attached with the fifth roller and separable to enable the pipe roll to be mounted.

12. The apparatus of claim 11 including an eighth roller releasable attached with the sixth roller and separable to enable the pipe roll to be mounted.

13. An apparatus for supporting and dispensing a pipe roll, said apparatus comprising:
   a frame that includes opposite one and other frame ends;
   a first pair of rollers that are spacedly disposed and mounted at the one end of the frame;
   a second pair of rollers that are spacedly disposed and mounted at the other end of the frame;

said second pair of rollers being disposed in spaced relationship to said first pair of rollers;

said first and second pairs of rollers all extending substantially in parallel to each other and defining a circular locus with corresponding support points for the pipe roll;

and a third pair of rollers releasably attached with the first pair of rollers outboard thereof.

14. The apparatus of claim 13 including a fourth pair of rollers releasably attached with the second pair of rollers outboard thereof.

15. The apparatus of claim 14 wherein one roller of the third pair is releasable from the other roller of the third pair.

16. The apparatus of claim 15 wherein one roller of the fourth pair is releasable from the other roller of the fourth pair.

17. An apparatus for supporting and dispensing a pipe roll, said apparatus comprising:
a frame that includes opposite one and other frame ends;
a first pair of rollers that are spacedly disposed and mounted at the one end of the frame;
a second pair of rollers that are spacedly disposed and mounted at the other end of the frame;
said second pair of rollers being disposed in spaced relationship to said first pair of rollers;
said first and second pairs of rollers all extending substantially in parallel to each other and defining a circular locus with corresponding support points for the pipe roll;
and a spool support attached at a location between the pairs of rollers.

18. An apparatus for supporting and dispensing a pipe roll, said apparatus comprising:
a frame that includes opposite one and other frame ends;
said frame comprised of a pair of elongated spaced apart and side by side disposed frame rails;
a set of rollers that are spacedly disposed and mounted in an upright manner from the frame;
at least one of said rollers of said set of rollers being supported from one of said frame rails, and at least another of said rollers of said set of rollers being supported from the other of said frame rails;
a first pair of rollers that are spacedly disposed from each other and mounted at the frame extending substantially transverse to the set of rollers;
a second pair of rollers being disposed in spaced relationship to said first pair of rollers;
said second pairs of rollers being pivotal relative to the set of rollers.

19. The apparatus of claim 18 including a cross bar that inter-connects respective one and another rollers of said set of rollers.

20. The apparatus of claim 19 wherein the roller set includes two pairs of sub-set rollers and further including a cross bar for inter-connecting each sub-set of rollers.

21. The apparatus of claim 20 wherein each cross bar extends substantially orthogonal to and spaced over and between the frame rails.

22. An apparatus for supporting and dispensing a pipe roll that has an inner contact circumference, said apparatus comprising:
a frame that includes opposite one and other frame ends;
said frame comprised of a pair of elongated spaced apart and side by side disposed frame rails;
a first pair of rollers that are spacedly disposed and each has one end thereof mounted at the one end of the frame at respective frame rails, and further including another end;

a first cross bar that is coupled between respective frame rails, inter-connected between the another ends of the respective rollers of said first pair of rollers, and constructed and arranged so that each of said rollers of said first pair of rollers are readily rotatable;
a second pair of rollers that are spacedly disposed and each has one end thereof mounted at the other end of the frame at respective frame rails, and further including another end;
a second cross bar that is coupled between respective frame rails, inter-connected between the another ends of the respective rollers of said second pair of rollers, and constructed and arranged so that each of said rollers of said second pair of rollers are readily rotatable;
said second pair of rollers being disposed in spaced relationship to said first pair of rollers;
said first and second pairs of rollers all extending substantially in parallel to each other and defining a circular locus that corresponds to the inner contact circumference of the pipe roll.

23. The apparatus of claim 22 wherein the first cross bar extending substantially orthogonal to and spaced over and between the rails.

24. The apparatus of claim 23 wherein the second cross bar extending substantially orthogonal to and spaced over and between the rails.

25. The apparatus of claim 24 including a first roller assembly that couples with said first cross bar between ends thereof, is disposed outboard of said first pair of rollers and that includes a disconnect member that enables the pipe roll to be installed about said first and second pairs of rollers.

26. The apparatus of claim 25 including a second roller assembly that couples with said first cross bar between ends thereof, is disposed outboard of said second pair of rollers and that includes a disconnect member that enables the pipe roll to be installed about said first and second pairs of rollers.

27. An apparatus for supporting and dispensing a pipe roll, said apparatus comprising:
a frame that includes opposite one and other frame ends;
a first pair of rollers that are spacedly disposed and mounted at the one end of the frame;
a second pair of rollers that are spacedly disposed and mounted at the other end of the frame;
said second pair of rollers being disposed in spaced relationship to said first pair of rollers;
said first and second pairs of rollers all extending substantially in parallel to each other and defining a circular locus with corresponding support points for the pipe roll;
at least a first cross bar;
wherein said frame includes a pair of elongated spaced apart and substantially in parallel rails with the one end of the first pair of rollers mounted respectively from the pair of rails, and with the first cross bar extending substantially orthogonal to and spaced over and between the rails.

28. The apparatus of claim 27 including a second cross bar and wherein the one end of the second pair of rollers is mounted respectively from the pair of rails, and with the second cross bar extending substantially orthogonal to and spaced over and between the rails.

29. The apparatus of claim 28 including at least one base roller that the pipe roll rests upon disposed outboard of the first pair of rollers and extending substantially in parallel with said rails.

30. The apparatus of claim 29 including at least another base roller that the pipe roll rests upon disposed outboard of the second pair of rollers and extending substantially in parallel with said rails.

31. The apparatus of claim 30 including a pair of spaced apart base rollers outboard of both the first and second pairs of rollers, and readily rotatable.

32. The apparatus of claim 31 including a first roller assembly that couples with said first cross bar between ends thereof, is disposed outboard of said first pair of rollers and that includes a disconnect member that enables the pipe roll to be installed about said first and second pairs of rollers.

33. The apparatus of claim 32 including a second roller assembly that couples with said second cross bar between ends thereof, is disposed outboard of said second pair of rollers and that includes a disconnect member that enables the pipe roll to be installed about said first and second pairs of rollers.

34. The apparatus of claim 33 wherein said first roller assemblies includes a substantially horizontal roller pivotally attached to the first cross bar, and a substantially vertical roller coupled with the horizontal roller at a connector.

35. The apparatus of claim 34 wherein said second roller assemblies includes a substantially horizontal roller pivotally attached to the second cross bar, and a substantially vertical roller coupled with the horizontal roller at a connector.

36. The apparatus of claim 35 wherein both of the vertical rollers are supported at a lower end thereof from the frame, and wherein both the horizontal and vertical rollers are constructed and arranged for ready rotation.

37. An apparatus for supporting and dispensing a roll of material, said apparatus comprising:

a frame that includes opposite one and other frame ends and that is comprised of a pair of elongated spaced apart and side by side disposed frame rails each having the one and other frame ends;

a first pair of rollers that are spacedly disposed and mounted closer to the one end of respective frame rails of the frame;

each roller of said first pair of rollers being constructed and arranged to mount to a respective one of the frame rails;

a second pair of rollers that are spacedly disposed and mounted closer to the other end of respective frame rails of the frame;

each roller of said second pair of rollers being constructed and arranged to mount to a respective one of the frame rails;

said second pair of rollers being disposed in spaced relationship to said first pair of rollers;

said first and second pairs of rollers all extending substantially in parallel to each other and defining a circular locus with corresponding support points for the roll of material;

at least one additional roller disposed orthogonal to and outboard of said first pair of rollers; and at least one more additional roller disposed orthogonal to and outboard of said second pair of rollers.

38. The apparatus of claim 37 including a first cross bar that inter-connects respective rollers of said first pair of rollers.

39. The apparatus of claim 38 including a second cross bar that inter-connects respective rollers of said second pair of rollers.

40. The apparatus of claim 37 wherein both of the frame rails is adjustable in length in order to accommodate different diameter rolls.

* * * * *